(12) United States Patent
Pruitt et al.

(10) Patent No.: US 11,510,524 B2
(45) Date of Patent: Nov. 29, 2022

(54) KAMADO-STYLE COOKER WITH PELLET FEED

(71) Applicant: Align Machine Works, LLC, Athens, GA (US)

(72) Inventors: Joseph Pruitt, Athens, GA (US); Jeffrey Broadrick, Athens, GA (US); Kyle Aasness, Athens, GA (US)

(73) Assignee: Align Machine Works, LLC, Athens, GA (US)

( * ) Notice: Subject to any disclaimer, the term of this patent is extended or adjusted under 35 U.S.C. 154(b) by 316 days.

(21) Appl. No.: 17/072,858

(22) Filed: Oct. 16, 2020

(65) Prior Publication Data

US 2021/0052107 A1 Feb. 25, 2021

Related U.S. Application Data

(63) Continuation of application No. 16/842,449, filed on Apr. 7, 2020, now Pat. No. 10,842,317.

(60) Provisional application No. 62/889,821, filed on Aug. 21, 2019.

(51) Int. Cl.
| | |
|---|---|
| *A47J 37/07* | (2006.01) |
| *A47J 36/32* | (2006.01) |
| *A47J 36/06* | (2006.01) |
| *A47J 36/02* | (2006.01) |
| *A47J 36/04* | (2006.01) |

(52) U.S. Cl.
CPC .......... *A47J 37/0704* (2013.01); *A47J 36/02* (2013.01); *A47J 36/04* (2013.01); *A47J 36/06* (2013.01); *A47J 36/32* (2013.01); *A47J 2202/00* (2013.01)

(58) Field of Classification Search
CPC .......... A47J 37/07–0772; A47J 37/0786; A47J 2037/0777
See application file for complete search history.

(56) References Cited

U.S. PATENT DOCUMENTS

| | | | | |
|---|---|---|---|---|
| 3,354,848 | A | * 11/1967 | Tolston | ............... A47J 37/0704 126/25 R |
| 2010/0218754 | A1 | * 9/2010 | Kuntz | ................. A47J 37/0786 126/25 R |
| 2011/0214662 | A1 | 9/2011 | Contrino, Jr. | |
| 2012/0060699 | A1 | 3/2012 | Shidler | |
| 2014/0026766 | A1 | 1/2014 | Goff, IV | |
| 2015/0114238 | A1 | 4/2015 | Palermo | |
| 2017/0215641 | A1 | * 8/2017 | DeBruler | ............ A47J 37/0704 |
| 2017/0367534 | A1 | 12/2017 | Bogazzi | |
| 2018/0263415 | A1 | 9/2018 | Hackley | |

(Continued)

FOREIGN PATENT DOCUMENTS

| | | |
|---|---|---|
| WO | 2013116946 | 8/2013 |
| WO | 2018204265 | 11/2018 |

*Primary Examiner* — John J Norton
(74) *Attorney, Agent, or Firm* — Smith Tempel Blaha LLC; Matthew T. Hoots

(57) ABSTRACT

Exemplary embodiments of a kamado-style cooker configured for use with pelletized fuel are disclosed. Certain embodiments include a cooking space above a firebox space. Various novel aspects of the cooker provide for thermal energy management within the firebox space such that temperature sensitive components of a wood pellet storage, delivery and combustion subsystem (e.g., electronic controllers, motors, pellet hopper and auger) may be housed within the firebox space, I.e., housed internal to the ovoid structural envelope of the cooker.

16 Claims, 29 Drawing Sheets

(56) References Cited

U.S. PATENT DOCUMENTS

2018/0325314 A1\* 11/2018 Walters .............. A47J 37/0713
2019/0069721 A1    3/2019 Walters
2020/0046163 A1    2/2020 Yang
2020/0240643 A1\*  7/2020 Donnelly ............. H04L 67/125

\* cited by examiner

KAMADO-STYLE COOKER WITH PELLET FEED

CROSS-REFERENCE TO RELATED APPLICATIONS

This application is a continuation of the U.S. Non-provisional application filed on Apr. 7, 2020 entitled "KAMADO-STYLE COOKER WITH PELLET FEED and assigned Ser. No. 16/842,449. By and through application Ser. No. 16/842,449, this application claims priority to the U.S. provisional application entitled "KAMADO STYLE SMOKER/GRILL WITH PELLET FEED," filed on Aug. 21, 2019 and assigned application Ser. No. 62/889,821. The entire contents of both Ser. No. 16/842,449 and 62/889,821 are hereby incorporated by reference.

BACKGROUND

The solution relates to a kamado-style cooker for cooking food while imparting a smoked flavor to the food and more particularly to a kamado-style cooker fueled by wood pellets.

Traditional kamado-style cookers have a clay or ceramic shell comprised of a base and a lid that combine to define an overall ovoid, or egg shaped, structural envelope. Grill racks supporting the food to be cooked are positioned near the top of the base. The lower portion of the base serves as a firebox. Solid fuel, such as charcoal, is placed in the lower portion of the base and combusted. To generate smoke, wood chips may be mixed into the solid fuel. When cooking, temperature and smoke generation may be precisely controlled through settings for dampers in the base and lid.

There has been a long felt need in the art to fuel a kamado-style cooker with wood pellets; however, simply using wood pellets as a solid fuel in the base instead of charcoal is not a viable solution for at least the reason that the combustion properties of a pile of wood pellets in a traditional kamado-style cooker are unsatisfactory. As one of ordinary skill in the art would understand, using wood pellets as a fuel source for grilling requires a controlled feed of wood pellets into a firebox. The controlled feed of wood pellets to the firebox commonly emanates from a hopper of wood pellets using an auger-styled delivery system. The wood pellet supply in the hopper and the auger system must remain relatively cool so as not to combust prematurely before reaching the firebox. Moreover, the electronic controls commonly associated with a wood pellet grilling system must also be shielded from exposure to excessive thermal energy. Consequently, prior art attempts to use wood pellets in a kamado-style cooker, which by design is capable of accommodating relatively high temperatures, have leveraged a wood pellet hopper and control system that is external to the kamado-style cooker's ovoid structural envelope. That is, prior art solutions for using wood pellets as a fuel source in a kamado-style cooker have kept the wood pellet supply and delivery system outside of the cooker's egg-shaped structure in order to avoid the difficulties of managing exposure to high thermal energy levels.

The external positioning of the wood pellet supply and delivery system in the prior art solutions for utilizing wood pellets as a fuel source in a kamado-style cooker makes for an end product with poor visual aesthetics, excessive space footprint, high cost of manufacture, and inefficient fuel delivery. Therefore, there is a need in the art for a system and device that addresses the shortcomings of the prior art, such as those outlined above, and provides for a wood pellet storage, delivery and combustion system that is integrated within the ovoid structural envelope of a kamado-style cooker.

SUMMARY

Exemplary embodiments of a kamado-style cooker with an internally integrated pellet delivery system are disclosed.

A kamado-style style cooker of the present solution includes a circumferentially enclosed aluminum base, a circumferentially enclosed aluminum adapter mounted on top of the aluminum base, a circumferentially enclosed ceramic cooking chamber base supported by the aluminum adapter, and a ceramic dome-shaped lid mounted for rotation with respect to the ceramic cooking chamber base. The ceramic cooking chamber base and the ceramic dome-shaped lid define a cooking space above the ceramic cooking chamber base. The aluminum base and the aluminum adapter form a firebox space below the aluminum adapter. The firebox space is separated from the cooking space by a firewall interposed between the aluminum adapter and the ceramic cooking chamber base.

The aluminum base is supported on four legs which in turn are supported on wheels for ease of movement of the kamado-style style cooker. A perforated shelf positioned adjacent the wheels extends from the legs and provides both support for the legs and convenient shelf for storage.

Within the firebox space, the kamado-style style cooker includes a firebox, a pellet hopper with an auger driven by an auger motor that delivers fuel pellets from the hopper directly into the firebox. The hopper is mounted within the aluminum base of the kamado-style style cooker and includes a funnel section that, based on gravity, directs the pellets to the auger for delivery to the firebox. The hopper includes a hopper opening in the front of the aluminum base that provides access to the interior of the hopper. A flush mounted hopper access door with a hidden hinge and latch covers the hopper opening and provides access to the interior of the hopper. A retractable chute that extends outward when the access door is opened may be included in some embodiments.

The firebox is elongated and has a D-shaped cross-section. The sides of the firebox have openings for the admission of combustion air. The firebox is surrounded by a shroud that creates air channels to direct the combustion air to the openings in the sides of the firebox. The firebox has a D-shaped top opening that penetrates firewall and the cooking chamber base to deliver heat to the cooking space. The firebox space also includes a fan for delivering ambient air as combustion air through the air channels to the openings in the sides of the firebox. Ambient air may be pulled into the firebox space through a perforated plate in the bottom of the aluminum base. Electronic controls are also located in the firebox space.

Within the cooking space, a grill rack is supported on the top edge of the ceramic cooking chamber base. A drip tray is supported on a lower portion of the ceramic cooking chamber base and below the grill rack. The drip tray catches drippings from the food supported on the grill rack and funnels the drippings to a collection pail on the outside of the cooking space. The drip tray also includes a heat deflector positioned above the firebox opening that distributes the heat from the firebox evenly across the drip tray and into the cooking space surrounding the grill rack.

The kamado-style style cooker includes a controller for controlling the temperature within the cooking space and the feed rate of pellets into the firebox. The user may set the desired temperature for the cooking space by means of a potentiometer connected to the controller. The dome-shaped lid includes a thermometer/temperature sensor for determining the temperature within the cooking space. The output of the temperature sensor may be fed to the controller and compared to the temperature set by the user. In order to control the temperature within the cooking space, the controller may control the speed of the fan and therefore the amount of combustion air delivered to the firebox. Based on pre-programming of the controller, the controller may control the speed of the auger motor in order to deliver the correct amount of pellets to the firebox.

An exemplary embodiment of a kamado-style cooker according to the solution has a substantially ovoid shape comprised of an upper half and a lower half. The upper half of the cooker is defined by a dome shaped lid with an exterior surface and an interior surface. The exterior surface of the dome shaped lid defines an exterior shape of the upper half of the cooker and the interior surface of the dome shaped lid defines an upper portion of an internal cooking space. The lower half of the cooker is defined by a first circumferential component and a second circumferential component, each of which has an exterior surface that collectively define an exterior shape of the lower half of the cooker. The first circumferential component and the second circumferential component are nested together to define a seam. A sealing component is in the seam defined by the nested first circumferential component and second circumferential component.

A cooking chamber base is configured to nest substantially within the first circumferential component such that an internal surface of the cooking chamber base defines a lower portion of the internal cooking space and an external bottom surface of the cooking chamber base cooperates with at least the second circumferential component of the lower half of the cooker to define a firebox space within the cooker. When the dome shaped lid is in a closed state, the cooking chamber base cooperates with the dome shaped lid to define the internal cooking space.

At least one of the exterior surface of the first circumferential component of the lower half of the cooker and the exterior surface of the dome shaped lid comprises a texture for increased surface area to promote thermal energy dissipation. The dome shaped lid and the cooking chamber base are each constructed of a pottery, earthenware, stoneware, porcelain, clay, refractory, or a composition of cement and lava rock. And, at least one of the first circumferential component and the second circumferential component is constructed of aluminum.

The exemplary kamado-style cooker also includes a firewall component positioned within the first circumferential component of the lower half of the cooker and in juxtaposition to the external bottom surface of the cooking chamber base. The cooker further includes a firebox having an upper end and a lower end and configured for combustion of a pelletized fuel, the firebox residing substantially within the firebox space and positioned such that a heat deflector associated with the upper end of the firebox resides within the lower portion of the internal cooking space. The cooker also includes a hopper component residing within the firebox space and configured to receive a pelletized fuel as well as a motor-driven auger residing within the firebox space and in mechanical communication with the hopper component and the firebox such that actuation of the auger operates to materially transfer pelletized fuel from the hopper to the firebox.

The motor-driven auger is positioned on an angle and, in preferred embodiments, may be positioned on an angle of between 15 degrees and 85 degrees relative to level. The exemplary cooker further includes one or more motor-driven, rotating agitators positioned within the hopper component, a main fan residing within the firebox space and positioned to supply a first flow of air to the firebox to encourage combustion of the pelletized fuel, and a hopper fan residing within the firebox space and positioned to supply a second flow of air to the hopper. The second flow of air operates to pressurize the hopper at a second pressure that exceeds a first pressure associated with the first flow of air and, in this way, mitigates migration of excess thermal energy into the firebox space. A controller resides within the firebox space and is configured to actuate one or more of the motor-driven auger, the main fan, and the hopper fan according to a set of computerized instructions. The controller receives electrical inputs from one or more temperature sensors and pressure sensors and a user interface.

The exemplary cooker also includes a drip tray that resides within the lower portion of the internal cooking space and is mechanically separated from the heat deflector. A hopper access door in the exterior surface of the second circumferential component gives access to the hopper and a retracting chute such that when the hopper access door is opened the retracting chute is operable to extend outward from a retracted position to receive pelletized fuel into the hopper. The retracting chute is operable via a spring-loaded, four bar mechanism.

In another exemplary embodiment of the solution, a kamado-style cooker having a substantially ovoid shape includes an upper half and a lower half. The upper half of the cooker is defined by a dome shaped lid having an exterior surface and an interior surface. The exterior surface of the dome shaped lid defines an exterior shape of the upper half of the cooker and the interior surface of the dome shaped lid defines an upper portion of an internal cooking space. The lower half of the cooker is defined by at least one circumferential component having an exterior surface that defines an exterior shape of the lower half of the cooker. A cooking chamber base is configured to nest substantially within the at least one circumferential component such that an internal surface of the cooking chamber base defines a lower portion of the internal cooking space and an external bottom surface of the cooking chamber base cooperates with the at least one circumferential component to define a firebox space. A firebox having an upper end and a lower end is configured for combustion of a pelletized fuel and resides substantially within the firebox space. The firebox is positioned within the cooker such that a heat deflector associated with the upper end of the firebox resides within the lower portion of the internal cooking space. A motor-driven auger resides within the firebox space and is positioned on an angle of between 15 degrees and 85 degrees relative to level. The auger is in mechanical communication with the firebox such that actuation of the auger operates to materially transfer pelletized fuel from a hopper to the firebox. The dome shaped lid and the cooking chamber base are each constructed of a pottery, earthenware, stoneware, porcelain, clay, refractory, or a composition of cement and lava rock.

BRIEF DESCRIPTION OF THE DRAWINGS

In the drawings, like reference numerals refer to like parts throughout the various views unless otherwise indicated. For example, reference numeral 28 and reference numeral 228, or as another example reference numeral 118 and reference numeral 218, may refer to like parts in two exemplary embodiments of the solution, unless otherwise indicated or clearly understood to the contrary in view of the description. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
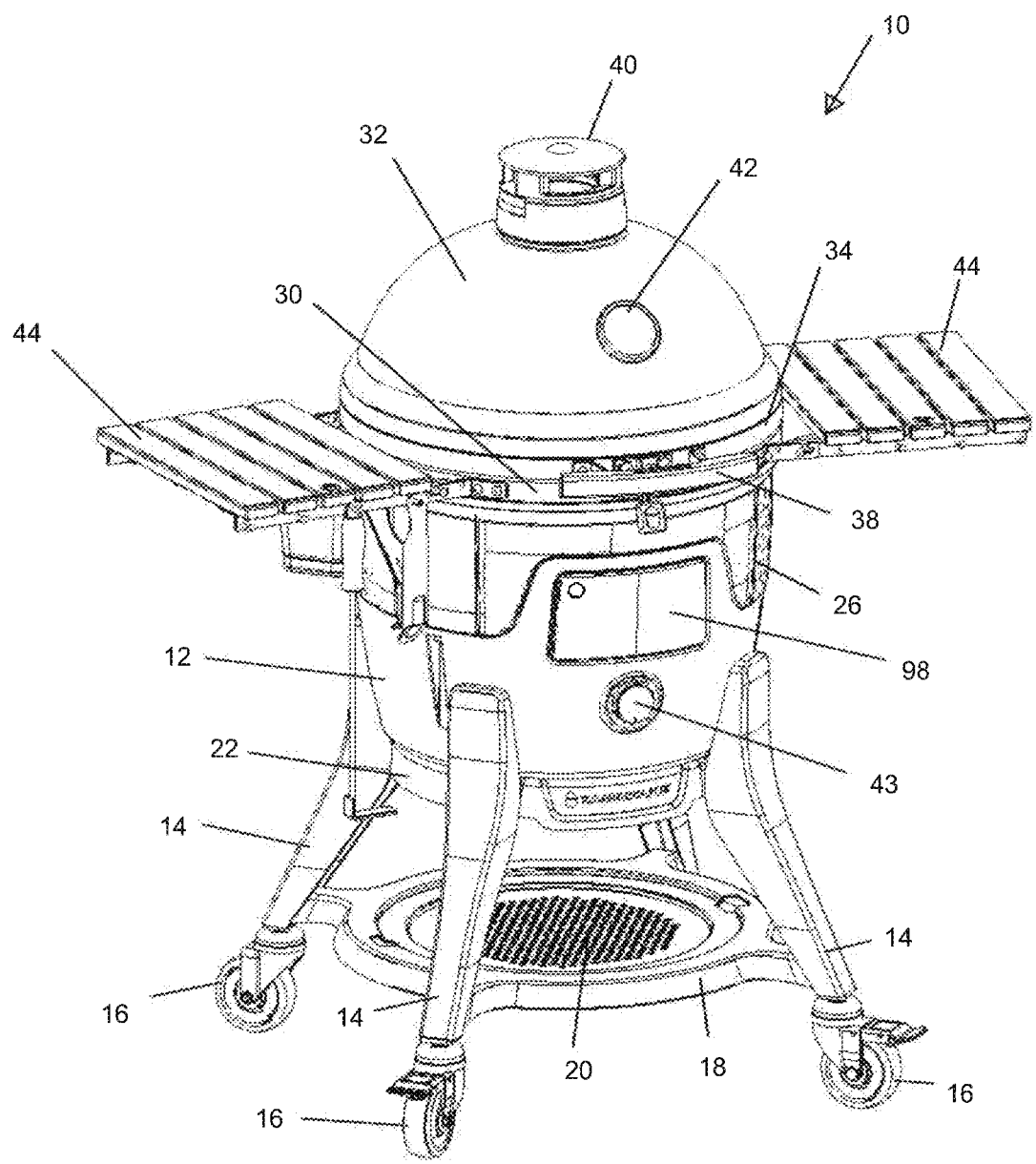
FIG. 1 is a front perspective view of an exemplary embodiment of a kamado-style cooker with pellet feed in accordance with the present solution.
Figure 2:
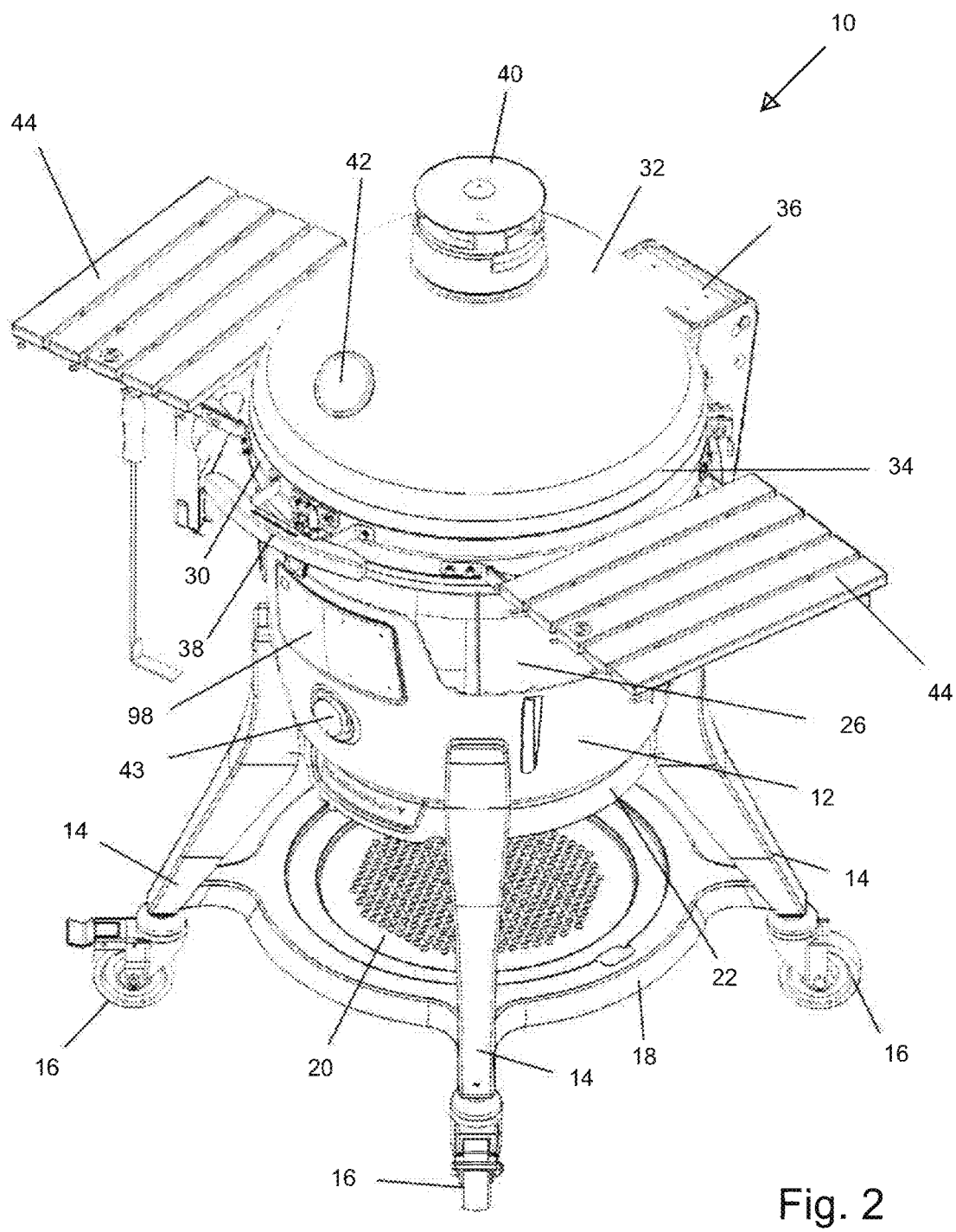
FIG. 2 is a right side perspective view of the exemplary embodiment of a kamado-style cooker with pellet feed in accordance with the present solution.
Figure 3:
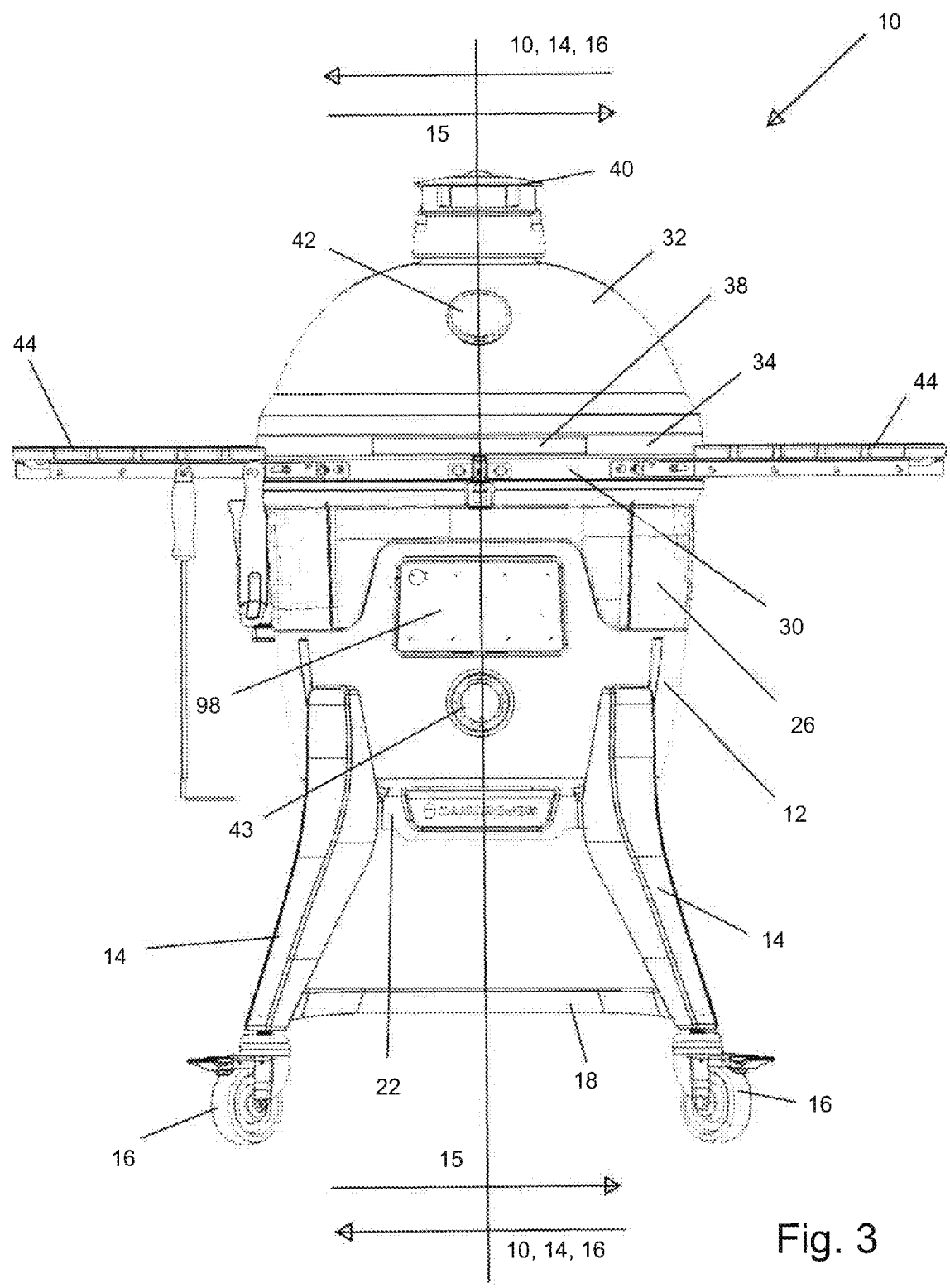
FIG. 3 is a front elevation view of the exemplary embodiment of a kamado-style cooker with pellet feed in accordance with the present solution.
Figure 4:
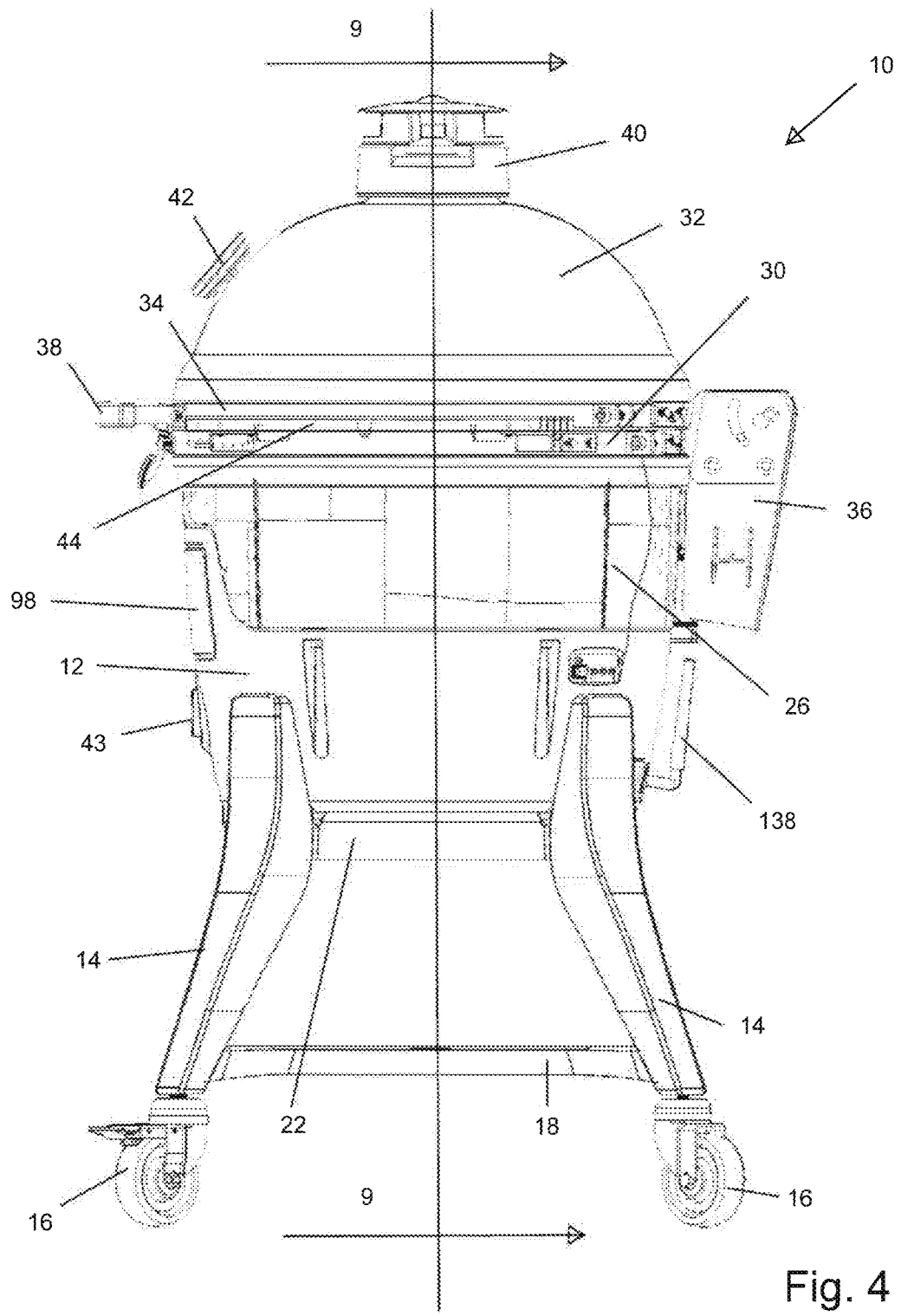
FIG. 4 is a right side elevation view of the exemplary embodiment of a kamado-style cooker with pellet feed in accordance with the present solution.
Figure 5:
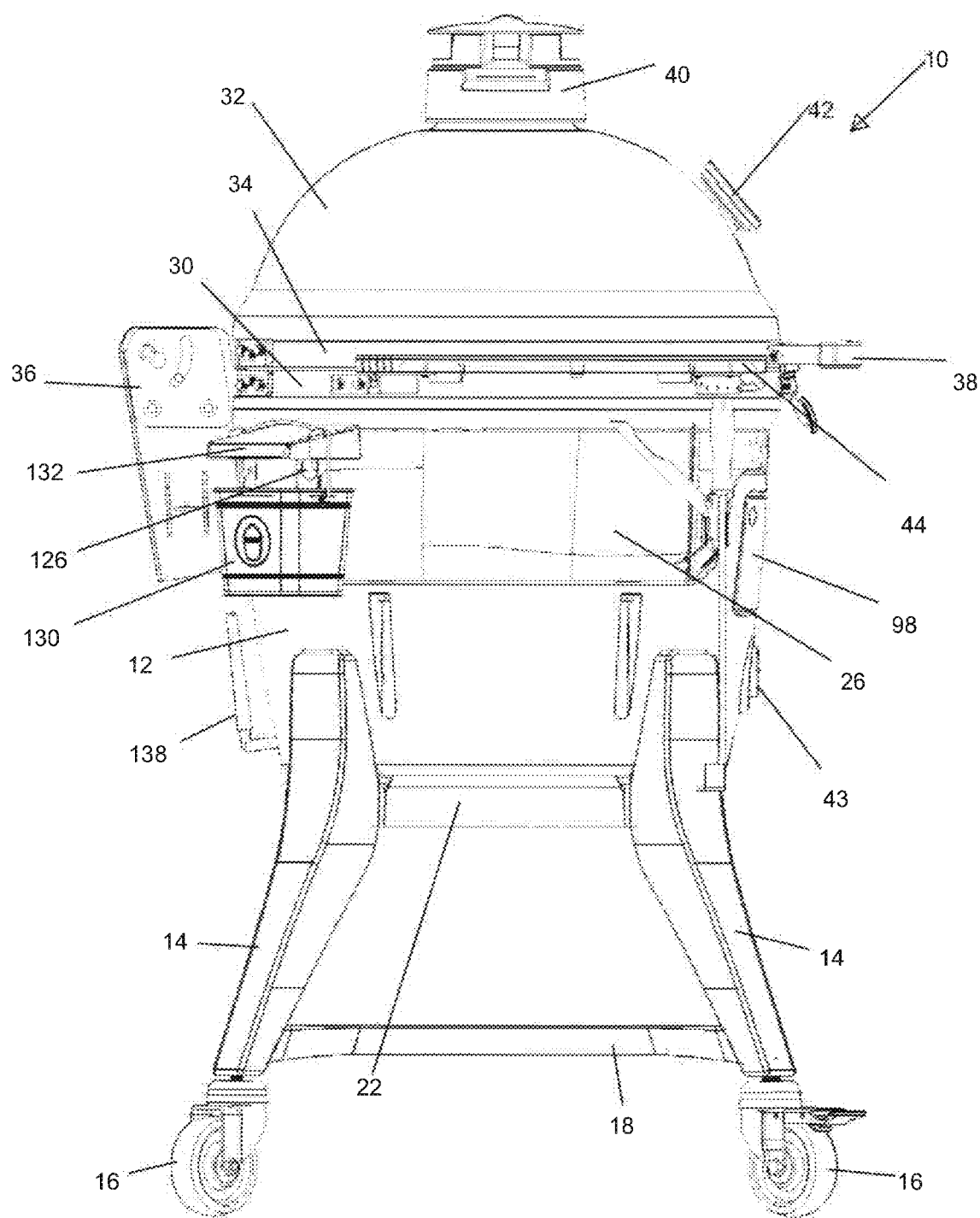
FIG. 5 is a left side elevation view of the exemplary embodiment of a kamado-style cooker with pellet feed in accordance with the present solution.
Figure 6:
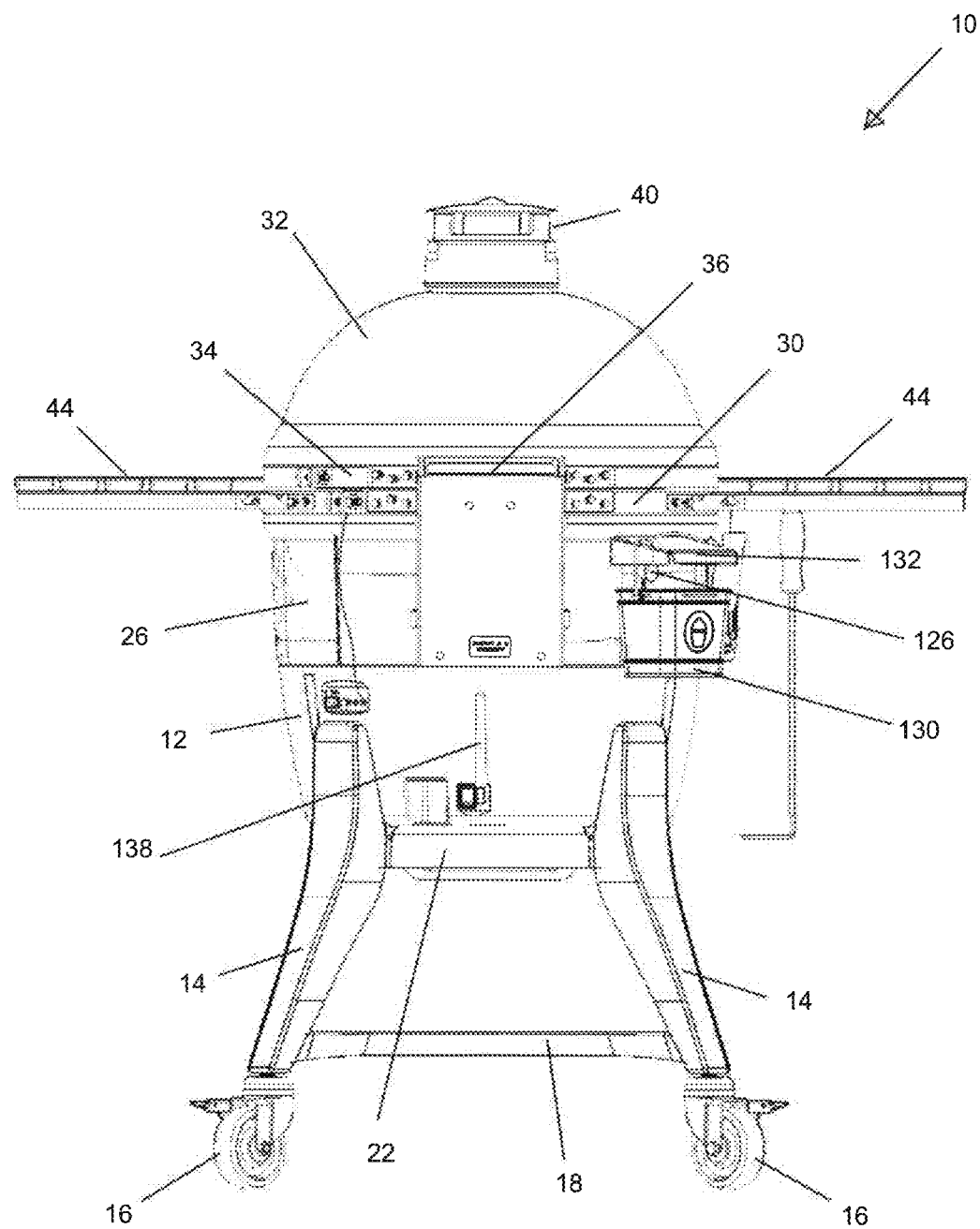
FIG. 6 is a back side elevation view of the exemplary embodiment of a kamado-style cooker with pellet feed in accordance with the present solution.
Figure 7:
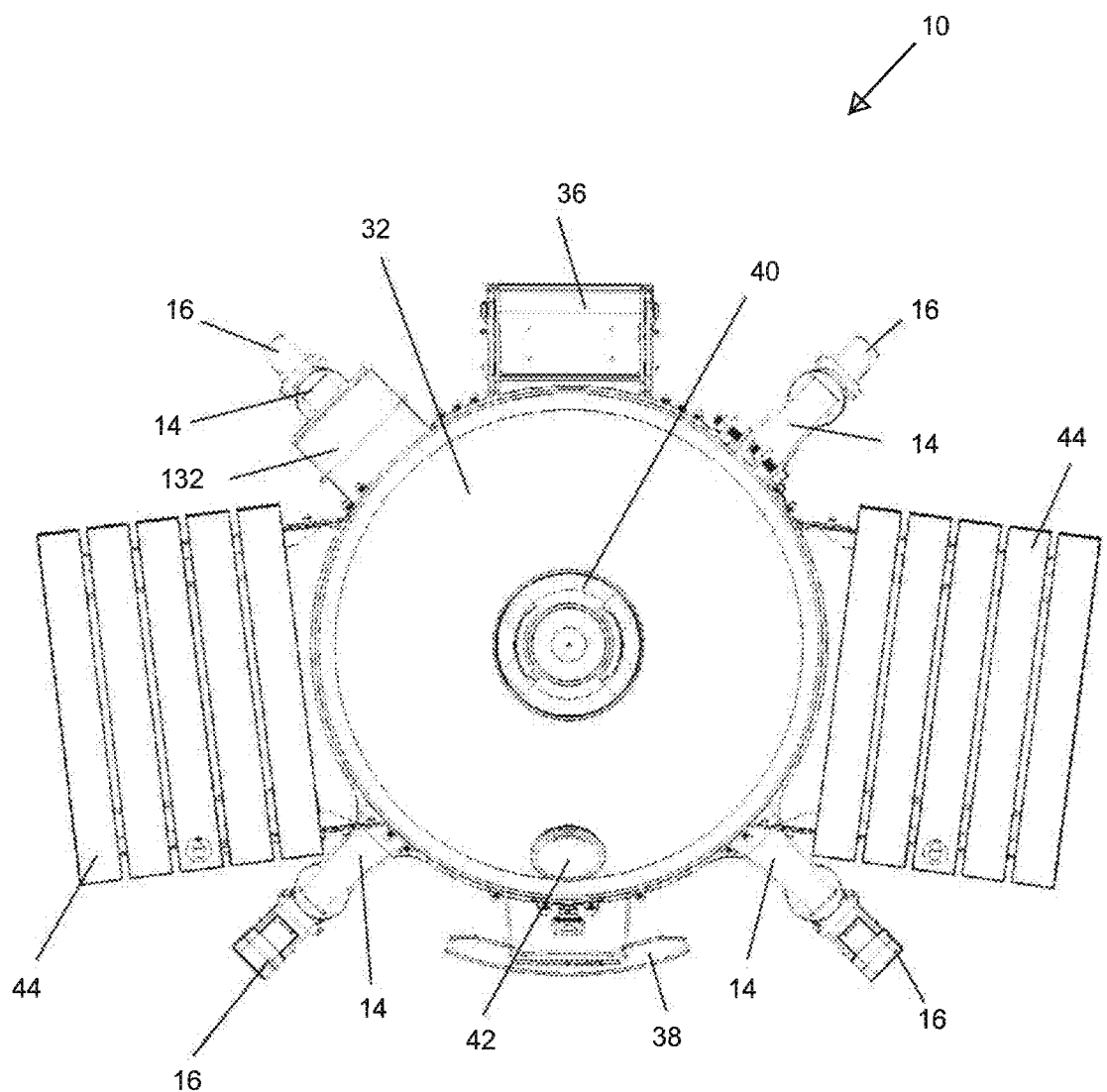
FIG. 7 is a top plan view of the exemplary embodiment of a kamado-style cooker with pellet feed in accordance with the present solution.
Figure 8:
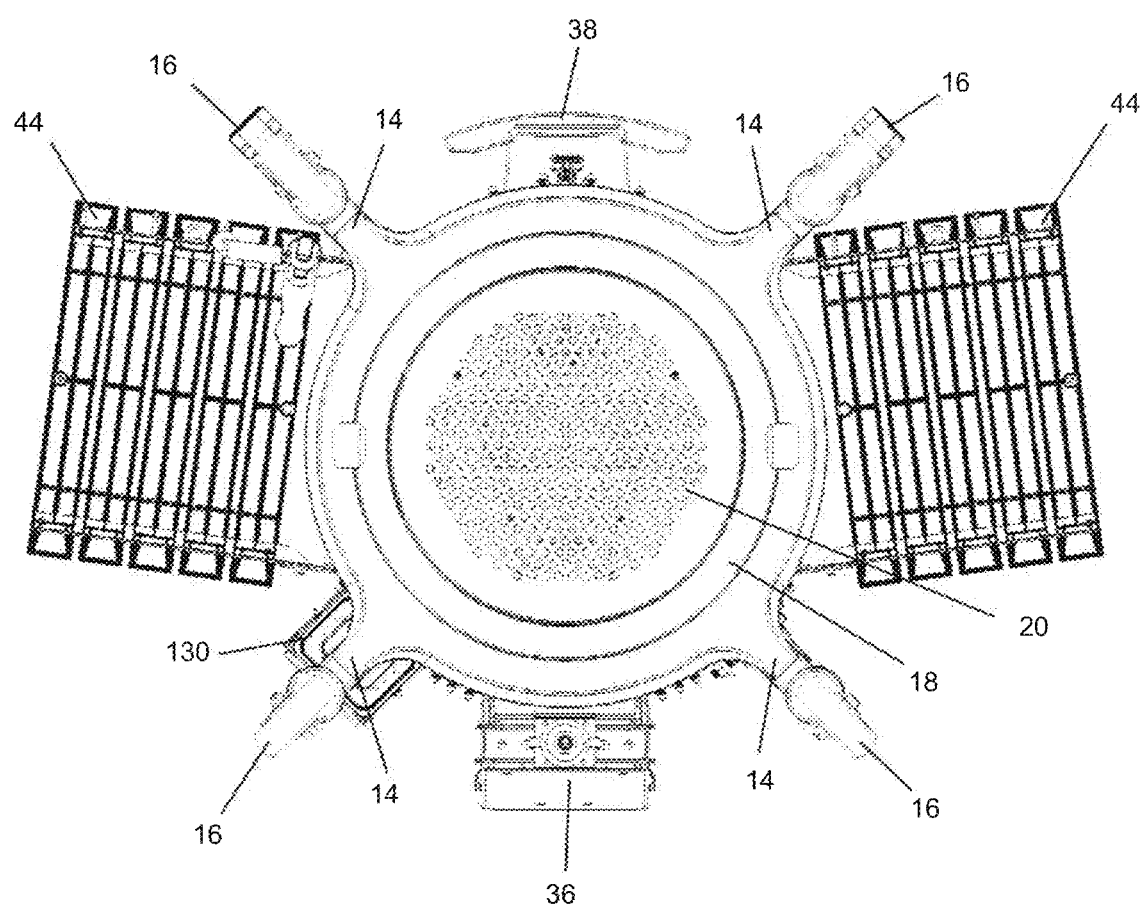
FIG. 8 is a bottom plan view of the exemplary embodiment of a kamado-style cooker with pellet feed in accordance with the present solution.
Figure 9:
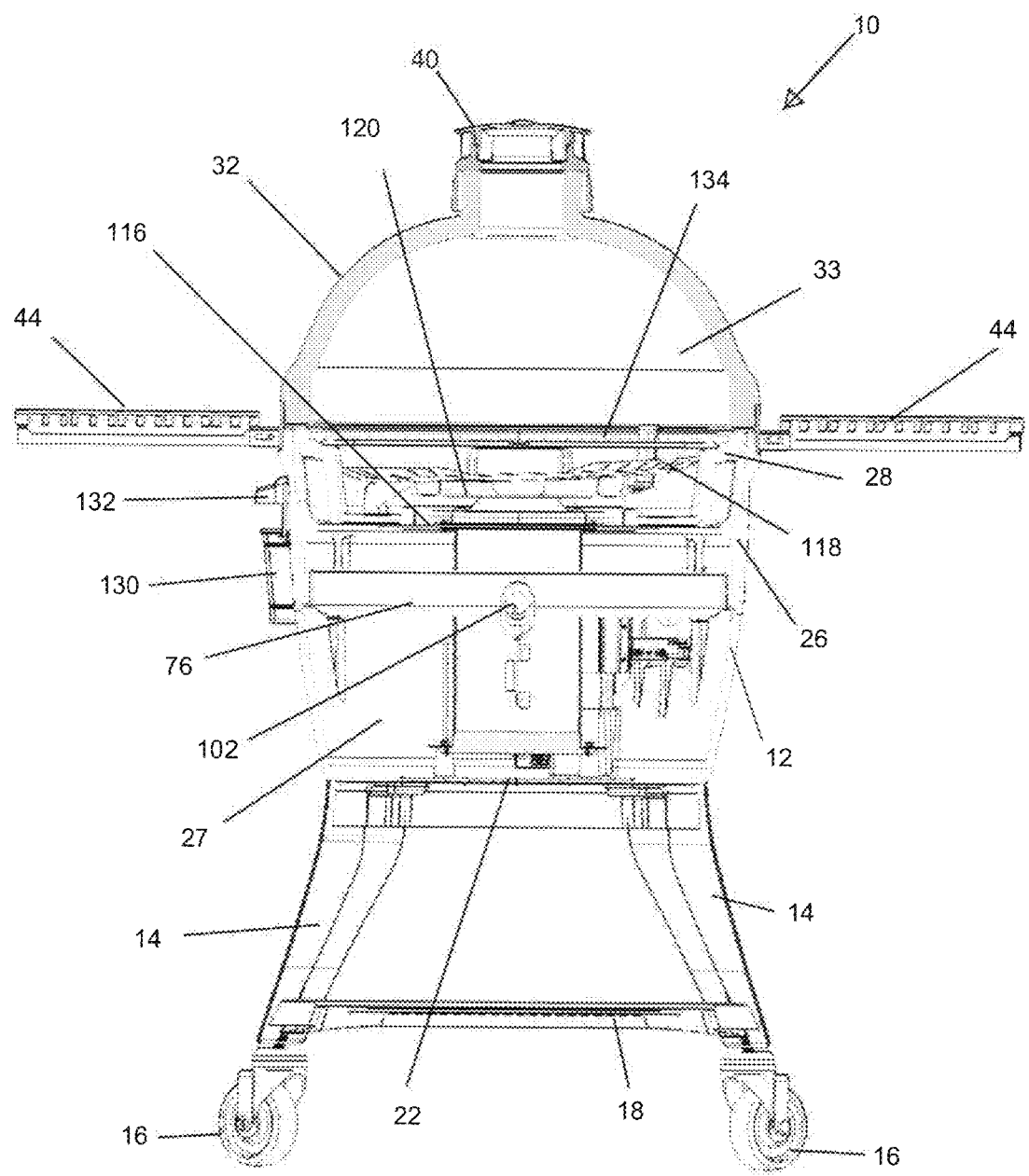
FIG. 9 is a front section view of the exemplary embodiment of a kamado-style cooker with pellet feed in accordance with the present solution, as seen along line 9-9 of the FIG. 4 illustration.
Figure 10:
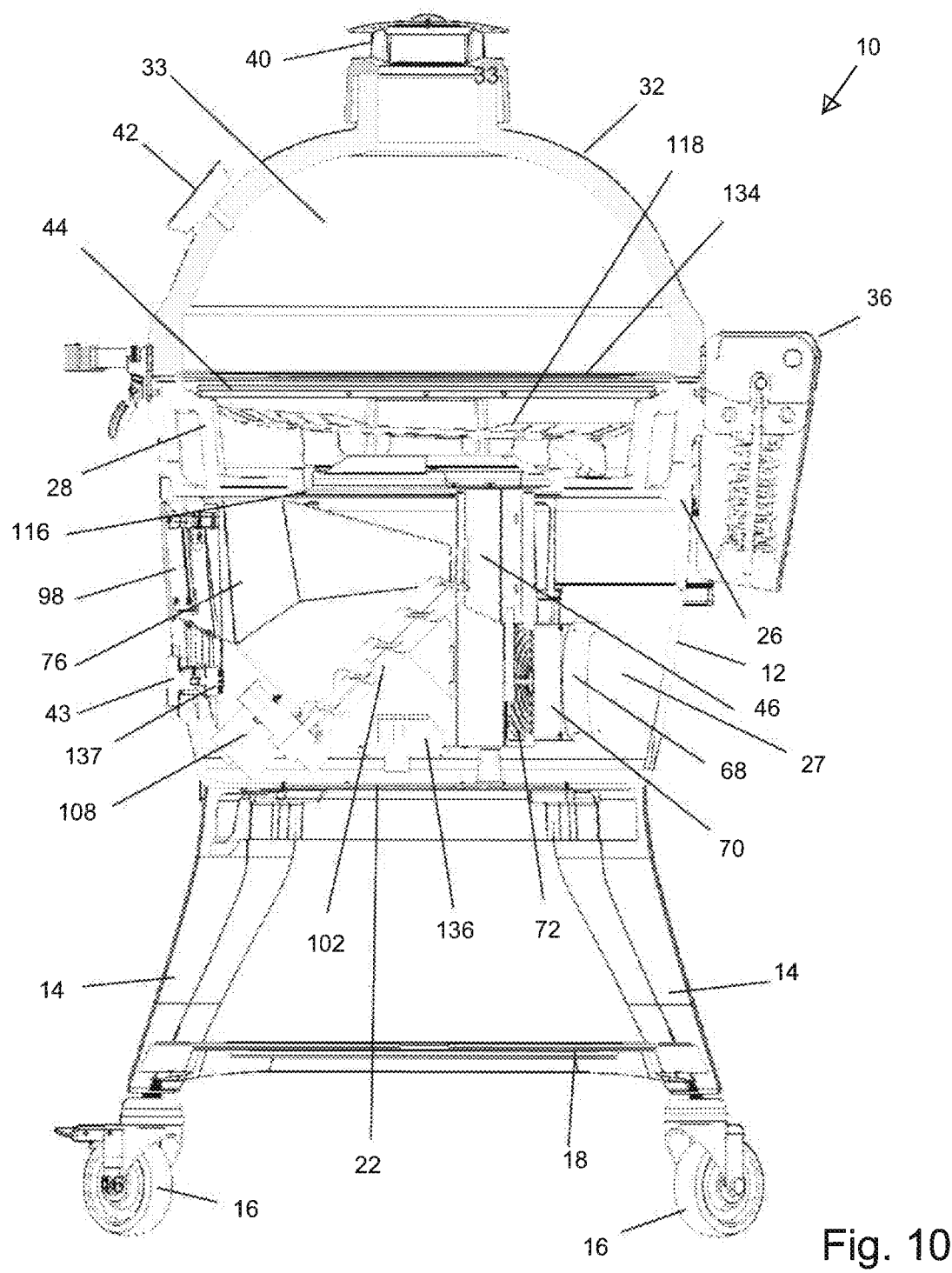
FIG. 10 is a right side section view of the exemplary embodiment of a kamado-style cooker with pellet feed in accordance with the present solution, as seen along line 10-10 of the FIG. 3 illustration.
Figure 11:
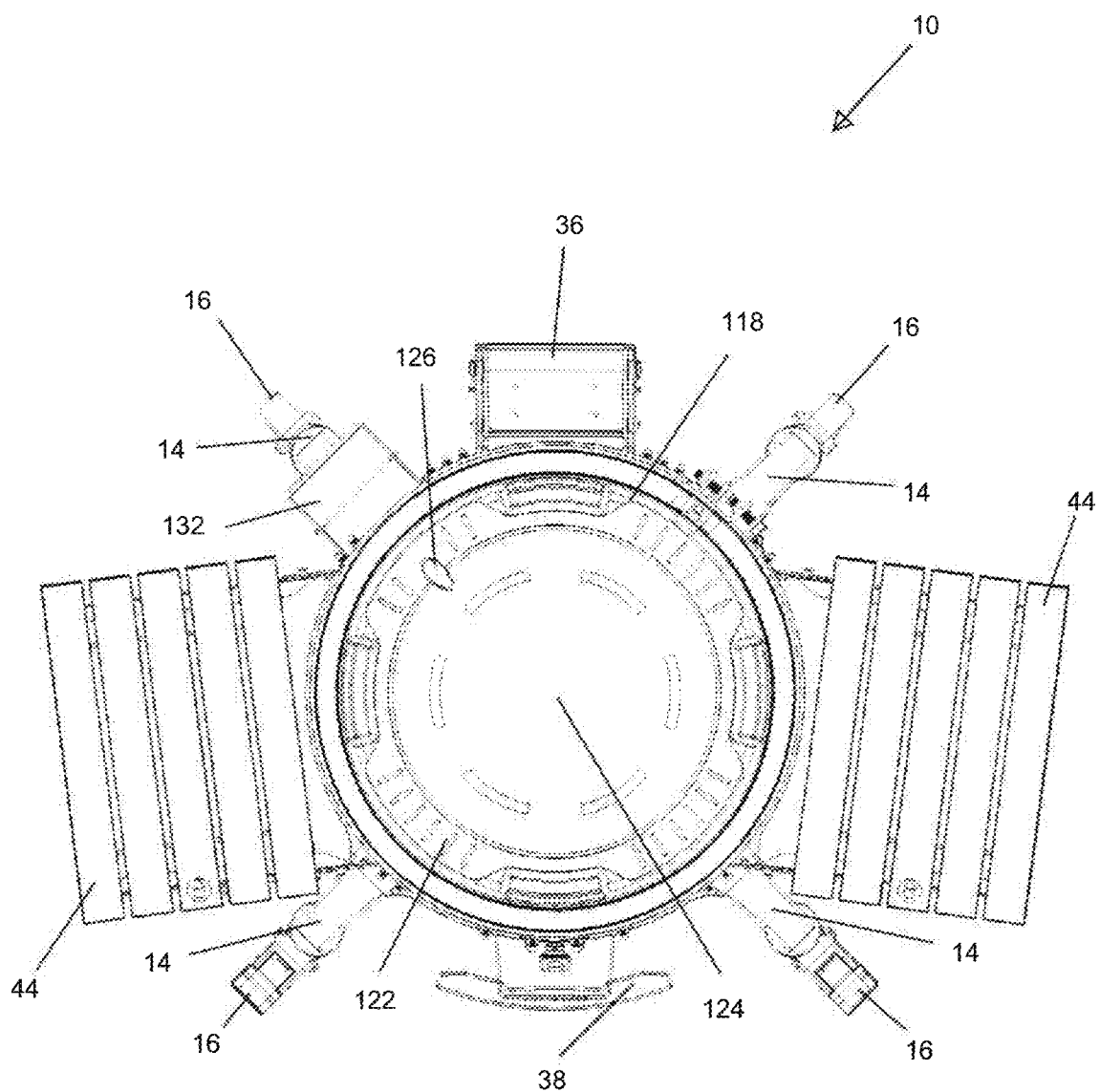
FIG. 11 is a top plan view of the exemplary embodiment of a kamado-style cooker with pellet feed in accordance with the present solution, with the dome-shaped lid removed to reveal internal detail.
Figure 12:
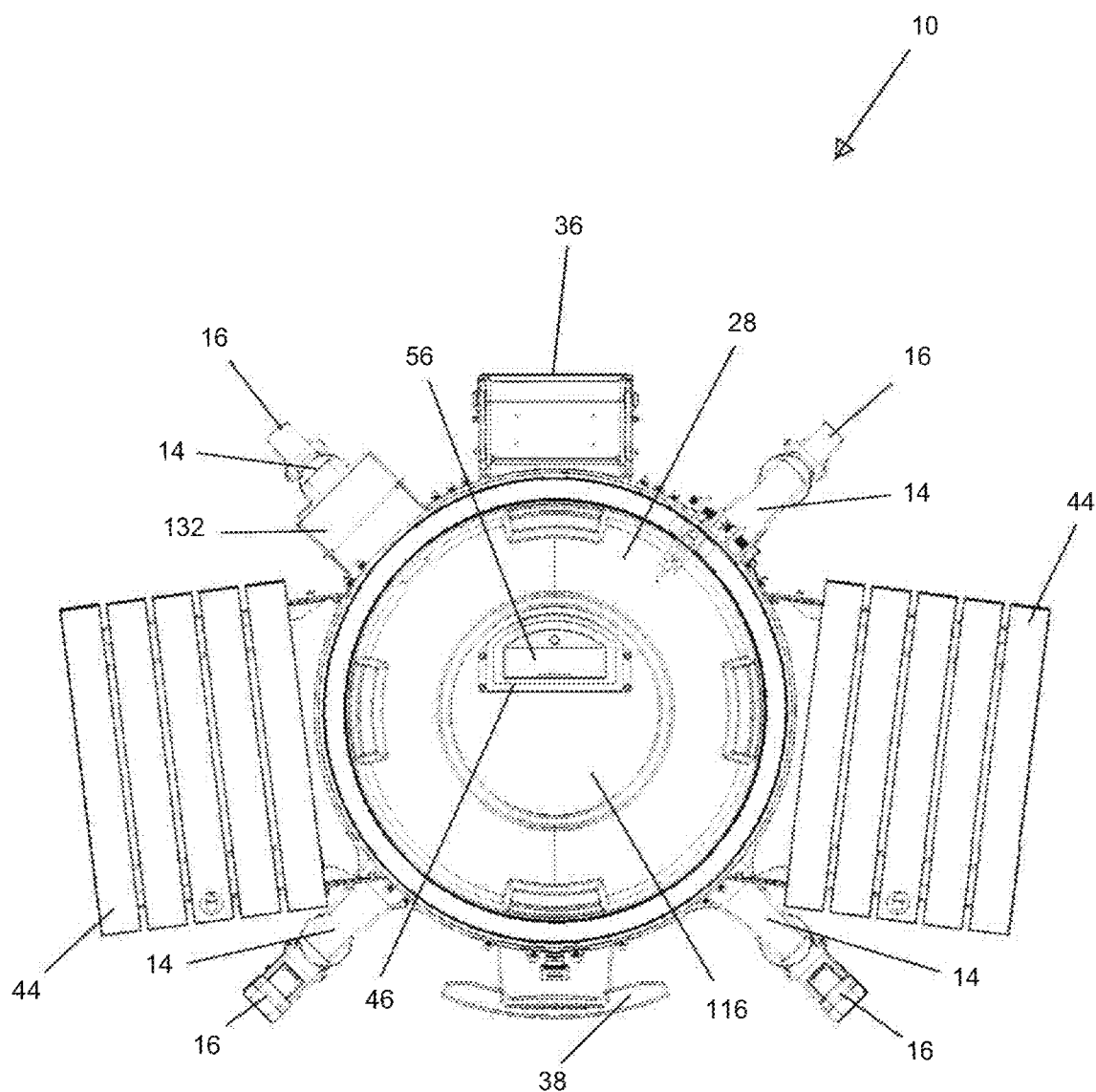
FIG. 12 is a top plan view of the exemplary embodiment of a kamado-style cooker with pellet feed in accordance with the present solution, with the dome-shaped lid and the drip tray removed to reveal internal detail.
Figure 13:
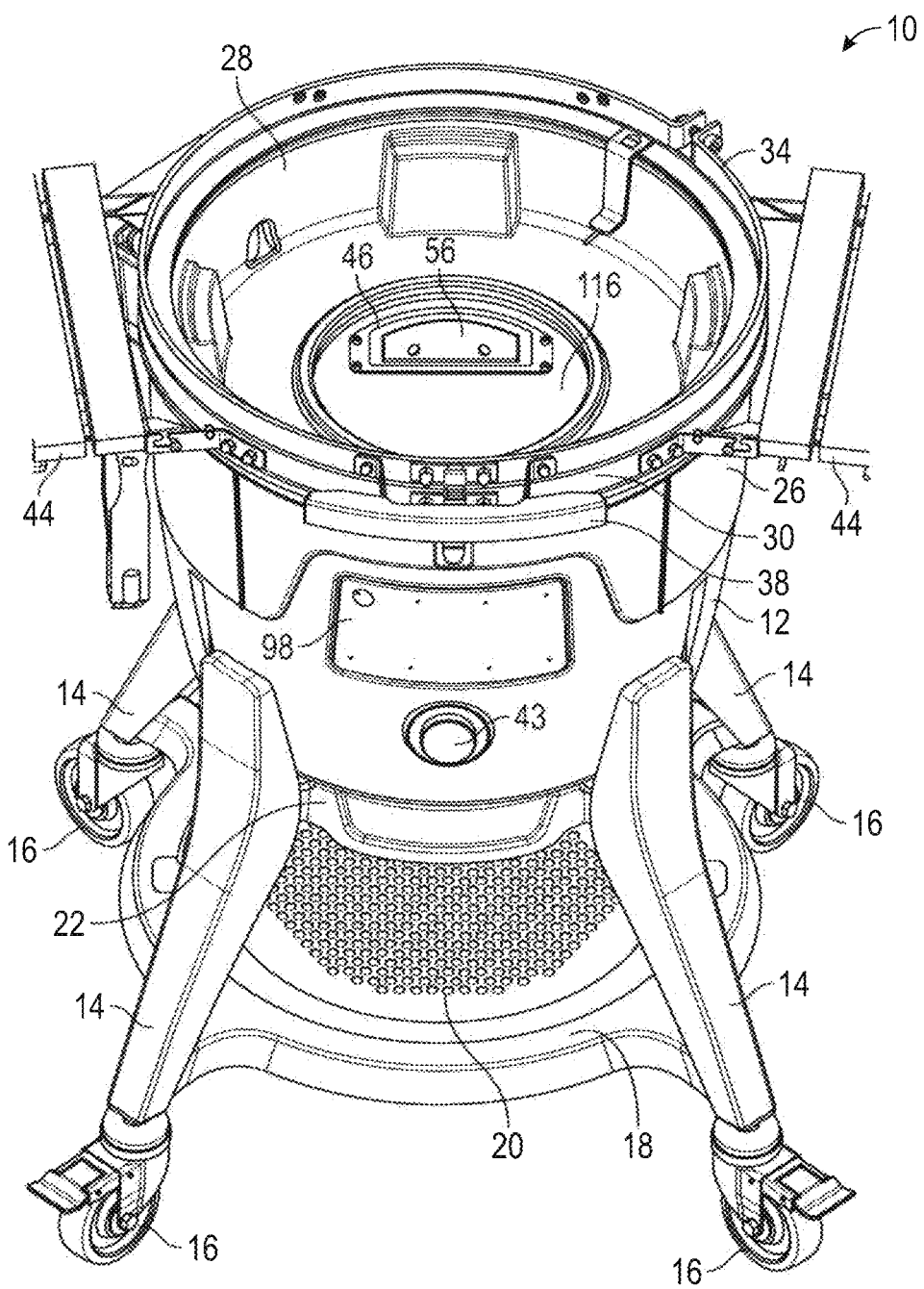
FIG. 13 is a top perspective view of the exemplary embodiment of a kamado-style cooker with pellet feed in accordance with the present solution, with the dome-shaped lid and drip tray removed to reveal detail.

Various embodiments, aspects and features of the present invention encompass a kamado-style cooker with an internally integrated pellet supply, delivery and combustion subsystem (the "SDC subsystem").

In this description, the terms "kamado-style cooker," "kamado" and the like are used interchangeably to refer to a cooker device commonly used for grilling and smoking food and constructed from a ceramic and/or a refractory material and/or a terra cotta clay and/or a composition of cement and lava rock. A common feature of a kamado-style cooker is that the overall shape is ovoid or "egg-like" such that the lid of a typical kamado-style cooker defines a domed interior space over a cooking grate. Notably, even though embodiments of the solution are described and illustrated in this description within the context of a "typical" kamado-style cooker having an ovoid body and ceramic materials of construction, it is envisioned that embodiments of the solution may be implemented in association with other barbecue grill designs as may be applicable.

In this description, it will be understood that the terms "thermal" and "thermal energy" may be used in association with a device or component within an embodiment of the solution capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" emitting device or component. For example, the "temperature" of two components within an embodiment of the solution is the same when the two components are in "thermal" equilibrium.

In this description, the term "wood pellets" is used to refer to a fuel source that may be used in some embodiments of the solution. It will be noted, however, that embodiments of the solution are not necessarily limited to use of wood pellets as a fuel source. That is, it is envisioned that embodiments of the solution may be configured to utilize other types of pelletized and/or chipped and/or granular fuel without departing from the scope of the invention. As such, use of the term "wood pellets" in this description is for convenience of illustration and does not imply or suggest that all embodiments of the solution are specifically configured for, or limited to, use of pelletized wood.

In this description, the term "ceramic" is intended to include high heat retention materials, such as pottery, earthenware, stoneware, porcelain, clay, refractory, and fired wares. Additionally, while embodiments of the solution described herein include various components constructed from aluminum, such as the base and adapter components that collectively form a lower half of a ovoid structural envelope in exemplary embodiments of the solution, other lightweight metals and metal alloys are envisioned.

Embodiments of the solution are directed toward a kamado-style cooker configured to use wood pellets as a fuel source. One of ordinary skill in the art would understand that wood pellets, as a fuel source, cannot simply be mounded in the bottom of a kamado-style grill in lieu of charcoal. A wood pellet fuel source requires controlled delivery of the wood pellets in order to efficiently combust the wood pellets and manage thermal energy generation and smoke generation useful for cooking. Advantageously, embodiments of the solution are configured to accommodate a wood pellet supply, delivery and combustion subsystem (the "SDC subsystem") within the ovoid structural envelope of a kamado-styled grill. As will be better understood from the attached figures and the following description, embodiments of the solution include any number of innovative aspects and features that address thermal energy management and thereby provide for a wood pellet SDC subsystem to be internal to, as opposed to external from, the ovoid structural envelope of a kamado-style grill.

As will also become more apparent from subsequent figures, the internal wood pellet SDC subsystem may deliver thermal energy and smoke into the cooking chamber of a kamado-style cooker from its firebox. As would be understood by one of ordinary skill in the art of grilling/smoking with a pelletized fuel, a temperature sensor may be leveraged to provide feedback to a controller that, in turn, controls actuation of a motor-driven auger (or functionally equivalent mechanism) in the SDC subsystem. Wood pellets that are gravity fed into the flutes of the auger and are delivered into a firebox for combustion via rotation of the auger. Changing the speed of auger rotation operates to change the rate of pellet delivery to the firebox. Advantageously, it is envisioned that certain embodiments of the solution may include an auger set on an angle, as opposed to a substantially vertical auger arrangement, such that a relatively longer auger may be incorporated within the ovoid structure of the kamado-style grill. By arranging an auger on an angle, such as an angle of between 15 degrees and 85 degrees relative to level, an auger that is relatively longer than an auger arranged vertically may be incorporated into the solution and, thereby, both increase the distance from a pellet supply (in the hopper) to the extreme heat of the firebox combustion chamber and mitigate clogging of pellets within the auger.

Returning to a general description of a kamado-styled grill configured according to the solution, by controlling the auger speed for pellet delivery to the firebox, the controller may cause a cooking temperature to be maintained at a desired temperature setting. The temperature setting determined by a user informs the controller in view of the temperature sensor signal to vary the speed of the combustion fan and auger motor. The controller may leverage a proportional-integral-derivative ("PID") control algorithm, as would be understood by one of ordinary skill in the art of process control. The auger motor causes rotation of the auger that functions to deliver wood pellets from a hopper (i.e., from a pellet supply) to the firebox. A heating element in communication with the firebox causes ignition of the wood pellets in the firebox.

As will become better understood from subsequent figures, wood pellets combusted in the firebox generate heat and smoke that are delivered directly into the cooking chamber of the kamado-style cooker. Advantageously, embodiments of the solution may include, in addition to the combustion fan, a hopper fan configured to generate an air pressure within the hopper, and by extension within the auger, that exceeds the air pressure generated by the combustion fan. In this way, embodiments of the solution may prevent, reduce or otherwise mitigate the excessive transfer of thermal energy from the firebox into the auger and/or hopper that could cause wood pellets to prematurely combust or soften and promote clogging.

As explained above, the extreme temperatures generated within the cooking chamber of a kamado-style cooker provides for a challenging environment in which to integrate an SDC subsystem. Consequently, prior art solutions seeking to use wood pellets as a fuel source for a kamado-style cooker have largely kept wood pellet supply and delivery components external to the ovoid structural envelope of the cooker. Advantageously, and as will become more apparent from the figures and description that follows, embodiments of the solution address thermal energy management within the ovoid structure of a kamado-style cooker by employing thermal breaks between components of different material constructions. Generally, the lower half of the ovoid structural envelope of a kamado-style cooker according to the solution may be composed of multiple components constructed from aluminum and, optionally, including textured outer surfaces for increased surface area to promote thermal energy dissipation. The upper half of the ovoid structural envelope of a kamado-style cooker according to the solution may be composed of traditional refractory materials, such as clay or ceramic, to define the cooking chamber. Advantageously, thermal breaks between the components of the upper half and lower half, coupled with the differing materials of construction, provide embodiments of the solution with a means for managing thermal energy within both halves such that the cooking chamber may benefit from the relatively high cooking temperatures normally associated with kamado cookers while the wood pellet SDC subsystem may safely reside within a space defined by the lower half of the ovoid structural envelope.

Turning to the drawings, an exemplary embodiment and components of a kamado-style cooker according to the solution is shown in FIGS. 1 through 21. The following description of the exemplary embodiment makes simultaneous reference to all applicable illustrations within FIGS. 1-21 unless specific reference to a given illustration or illustrations indicates otherwise.

As can be seen and understood from the illustrations, a kamado-style cooker 10 of the present solution includes a circumferentially enclosed aluminum base 12, a circumferentially enclosed aluminum adapter 26 mounted on top of the aluminum base 12, a circumferentially enclosed ceramic cooking chamber base 28 supported by the aluminum adapter 26, and a ceramic dome-shaped lid 32 mounted on the ceramic cooking chamber base 28 for rotation with respect to the ceramic cooking chamber base 28 via a hinge. The ceramic cooking chamber base 28 and the ceramic dome-shaped lid 32 define a cooking space or chamber 33 above the ceramic cooking chamber base 28. The aluminum base 12 and the aluminum adapter 26 form a firebox space 27 below the aluminum adapter 26. The firebox space 27 is separated from the cooking space 33 by a firewall 116.

The aluminum base 12 is supported on four legs 14 which in turn are supported on wheels 16 for ease of movement of the kamado-style style cooker 10. A top ring 22 joins the four legs 14 just below the aluminum base 12, and a bottom ring 18 joins the four legs 14 just above the wheels 16. The top ring 22, the bottom ring 18, and legs 14 provide a support stand for the aluminum base 12. A perforated plate 24 is supported by the top ring 22 and covers a portion of the open bottom of the aluminum base 12. The perforated plate 24 allows ambient air to enter the firebox space 27. A shelf 20 is supported by the bottom ring 18 and provides a shelf for storage.

The ceramic cooking chamber base 28 has a metal band 30 attached around its circumference near the top of the ceramic cooking chamber base 28. A similar metal band 34 is attached around the circumference of the dome-shaped ceramic lid 32 adjacent the bottom of the dome-shaped ceramic lid 32. The metal band 30 provides support for utility side shelves 44. The metal band 30 also provides an anchor for hinge 36. The metal band 34 around the dome-shaped ceramic lid 32 provides an anchor for the other part of hinge 36 so that the ceramic lid 32 can rotate with respect to the ceramic cooking chamber base 28. The metal band 34 also provides an anchor for a handle 38, which the user can grasp to open and close the dome-shaped lid 32. Further, the dome-shaped ceramic lid 32 has an adjustable top vent 40 to allow for the escape of smoke from the cooking space 33. By adjusting the top vent 40, the user can control the amount of smoke leaving the cooking space 33.

Within the firebox space 27, the kamado-style style cooker 10 includes a firebox 46 and a pellet hopper 76 with an auger 102 driven by an auger motor 108 that delivers fuel pellets from the hopper 76 directly into the firebox 46. The hopper 76 is mounted within the aluminum base 12 of the kamado-style style cooker 10 and includes a funnel 78 that, based on gravity, directs the pellets to the auger 102 for direct delivery to the firebox 46.

Turning specifically to FIGS. 14, 15, 20, and 21, the hopper 76 includes a hopper opening 99 in the front of the aluminum base 12 that provides access to the interior of the hopper 76. A flush mounted door 98, with a hidden hinge 100 and a hidden latch 101, covers the hopper opening 99 and provides access to the interior of the hopper 76. The hopper 76 includes a hopper funnel 78, hopper sides, and a hopper top. The hopper funnel 78 includes a funnel left side 80, a funnel right side 82, a funnel back side 84, and a funnel front side 86, all converging at funnel vertex 88. The hopper sides include a hopper front side 90, a hopper back side 92, a hopper left side rear 94, a hopper left side front 95, a hopper right side rear 96, and a hopper right side front 97. The hopper top includes a hopper top rear 79 and a hopper top front 77.

With continuing specific reference to FIGS. 14, 15, 20, and 21, the auger 102 includes an auger tube 104 with an auger screw 106 positioned inside. The auger screw 106 is driven by the auger motor 108. The auger tube 104 is positioned along the funnel back side 84 of the hopper 76. The auger tube 104 has an auger inlet 110 at one end that is positioned at the vertex 88 of the hopper 76. An auger outlet 112 at the other end of the auger tube 104 extends into the firebox 46 through a firebox opening 62. In operation, pellets in the hopper 76 move by gravity toward the hopper vertex 88 and into the auger inlet 110. The rotation of the auger screw 106 moves the pellets directly into the firebox 46.

Figure 14:
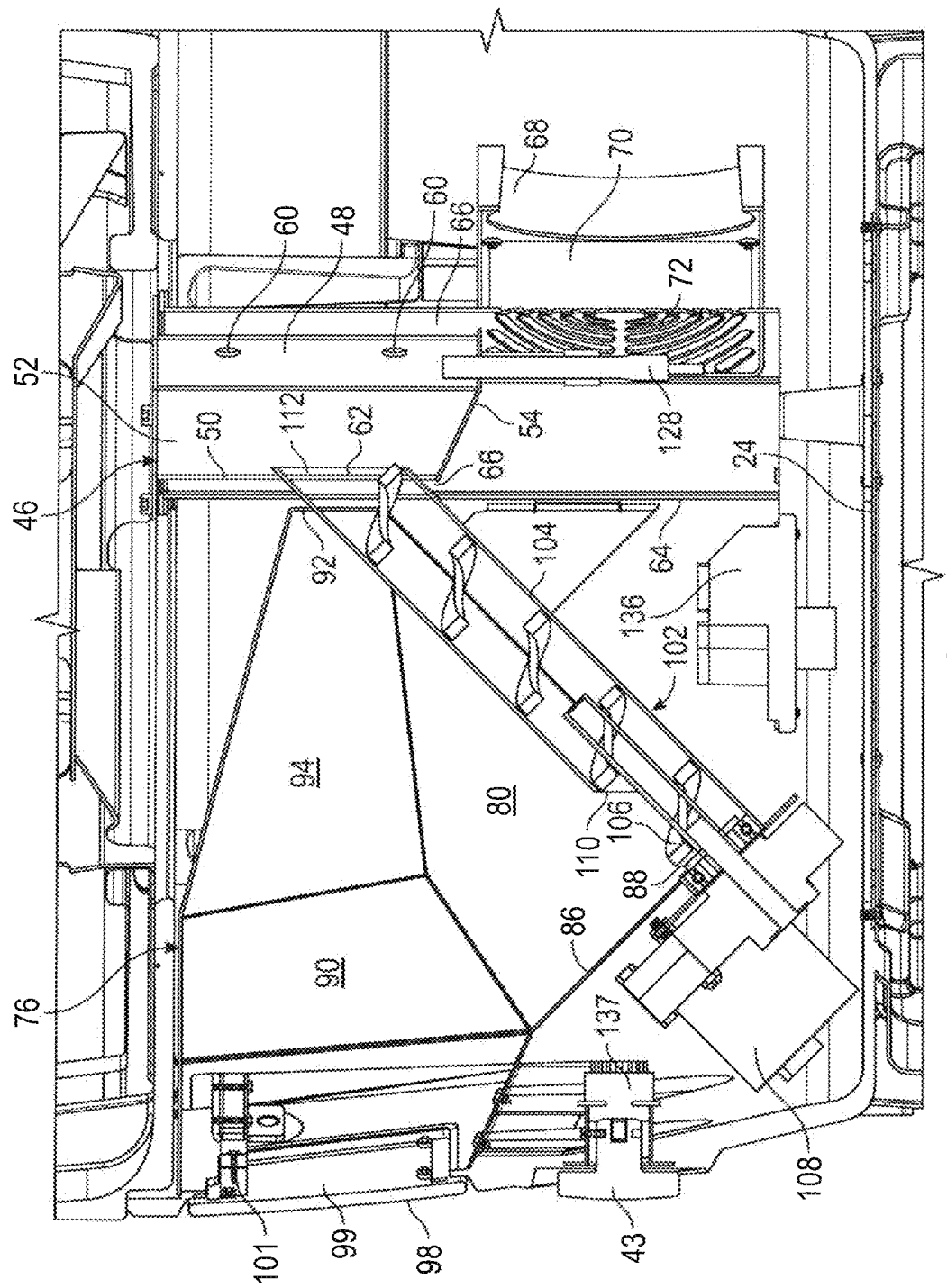
FIG. 14 is an enlarged right side section view of the exemplary embodiment of a kamado-style cooker with pellet feed in accordance with the present solution, as seen along line 14-14 in the FIG. 3 illustration.
Figure 15:
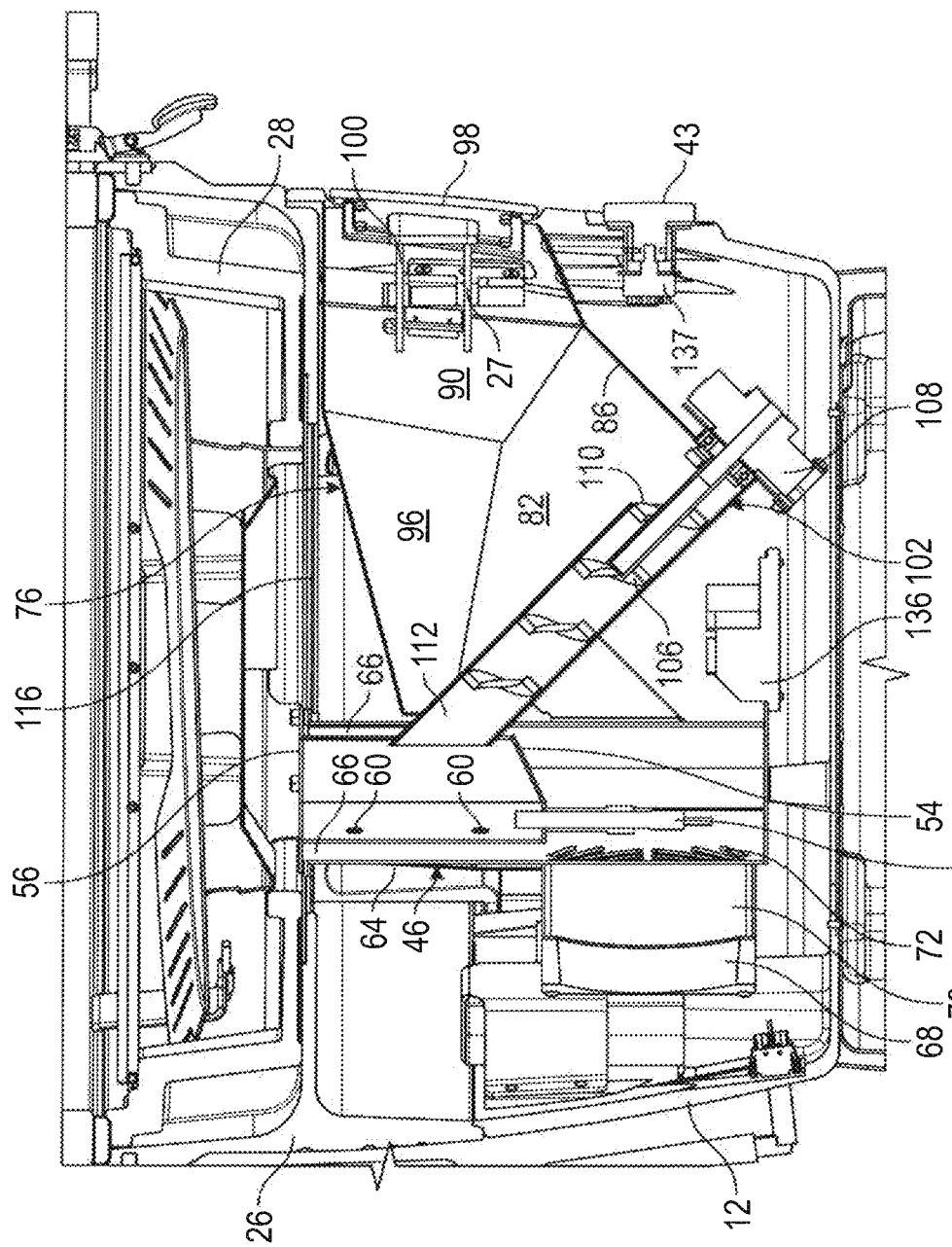
FIG. 15 is an enlarged left side section view of the exemplary embodiment of a kamado-style cooker with pellet feed in accordance with the present solution, as seen along line 15-15 in the FIG. 3 illustration.
Figure 16:
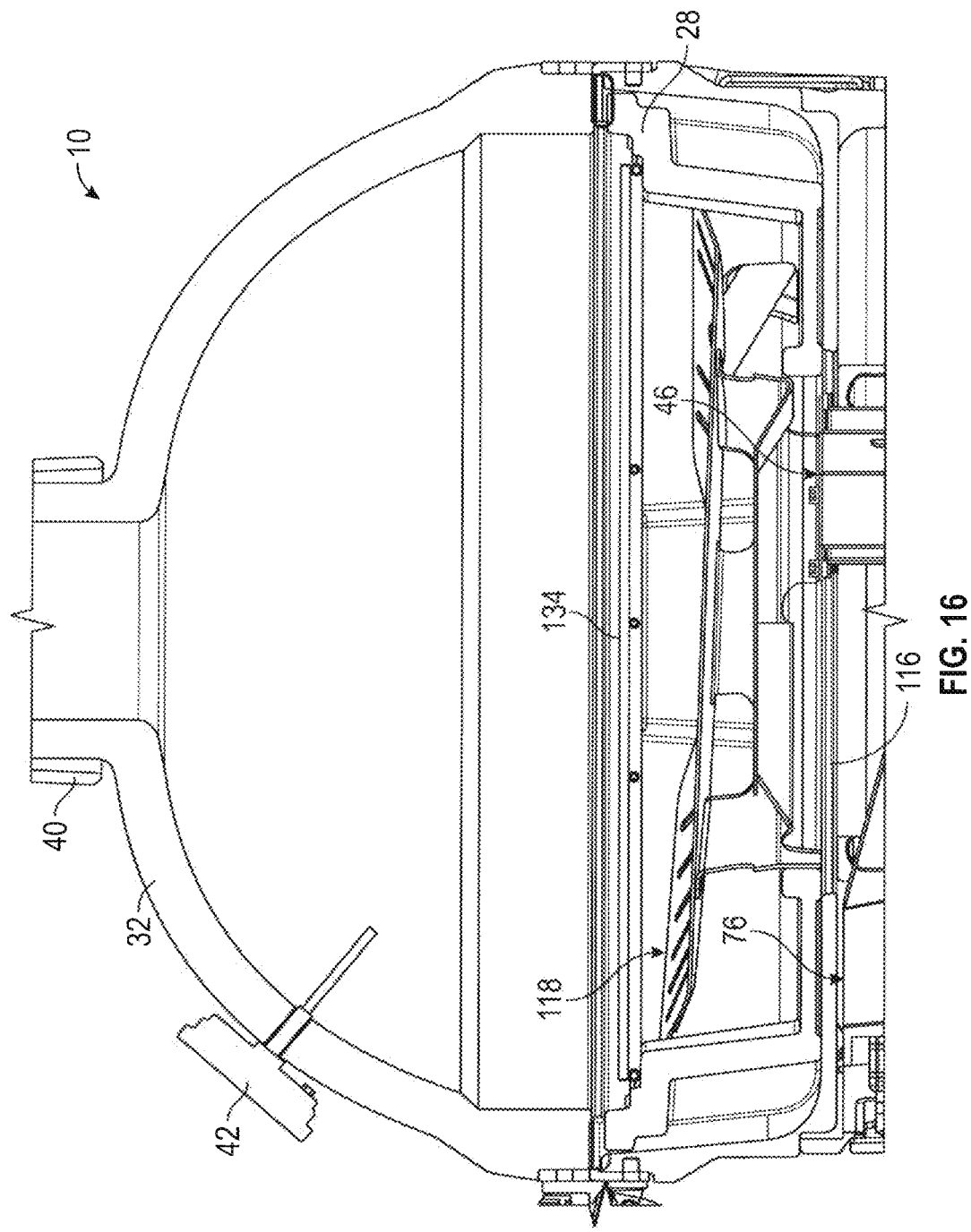
FIG. 16 is in enlarged right side section view of the exemplary embodiment of a kamado-style cooker with pellet feed in accordance with the present solution, as seen along line 16-16 in the FIG. 3 illustration.
Figure 17:
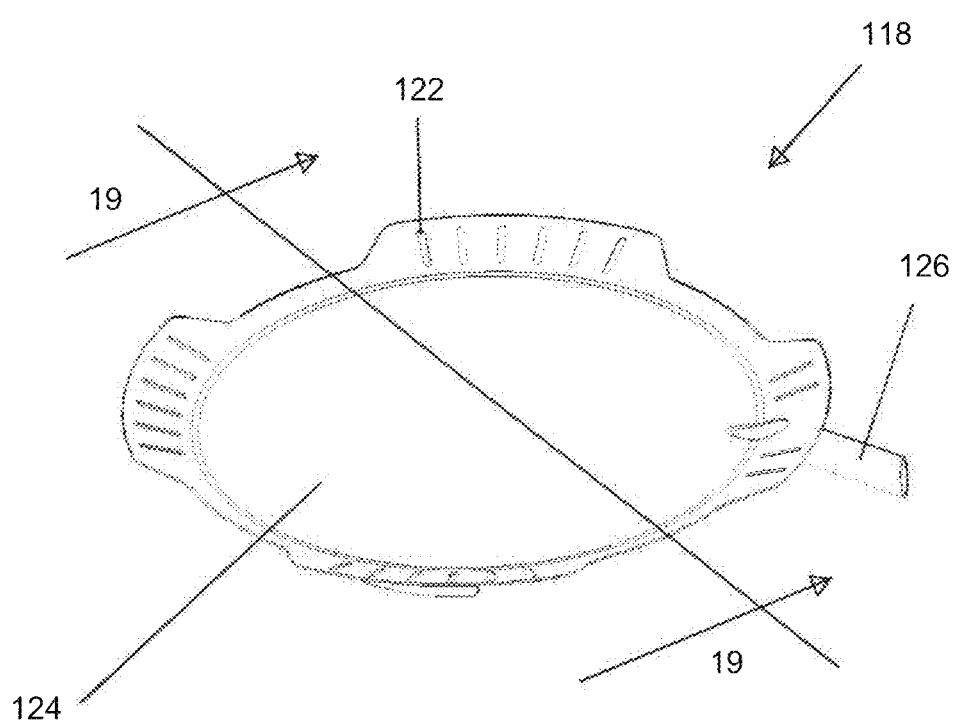
FIG. 17 is a top perspective view of the drip tray of the exemplary embodiment of a kamado-style cooker with pellet feed in accordance with the present solution.
Figure 18:
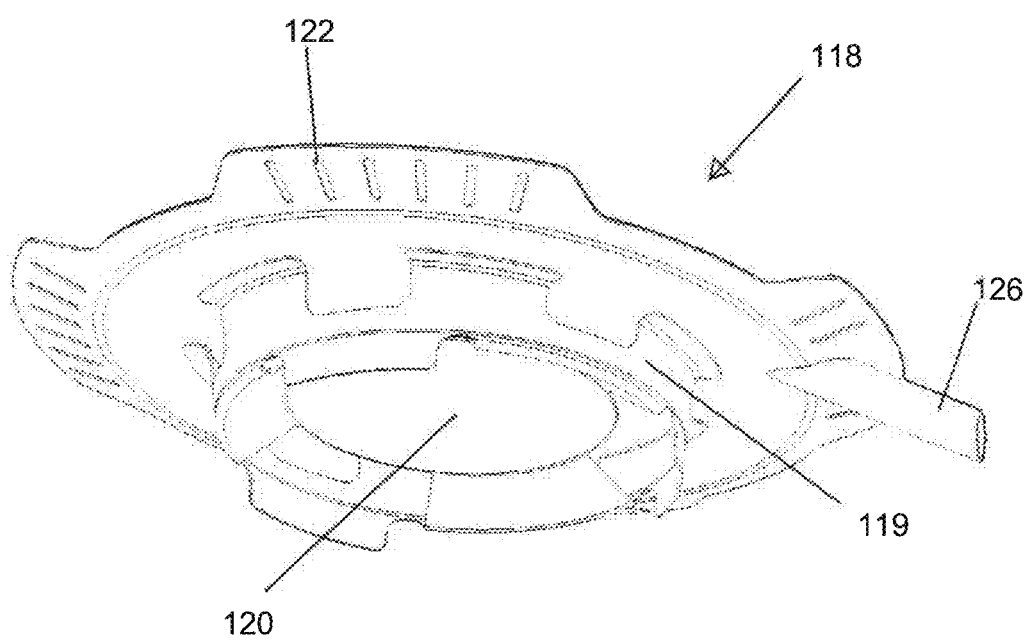
FIG. 18 is a bottom perspective view of the drip tray of the exemplary embodiment of a kamado-style cooker with pellet feed in accordance with the present solution.
Figure 19:
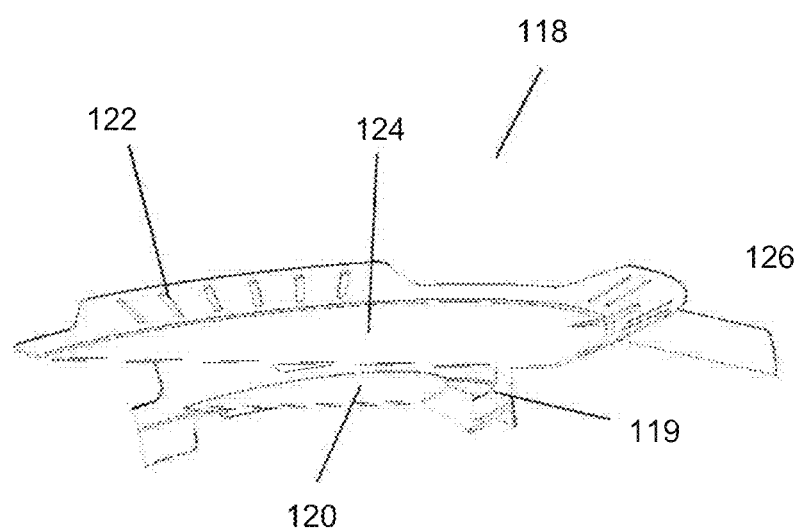
FIG. 19 is a section perspective view of the exemplary embodiment of a kamado-style cooker with pellet feed in accordance with the present solution, as seen along line 19-19 in the FIG. 17 illustration.
Figure 20:
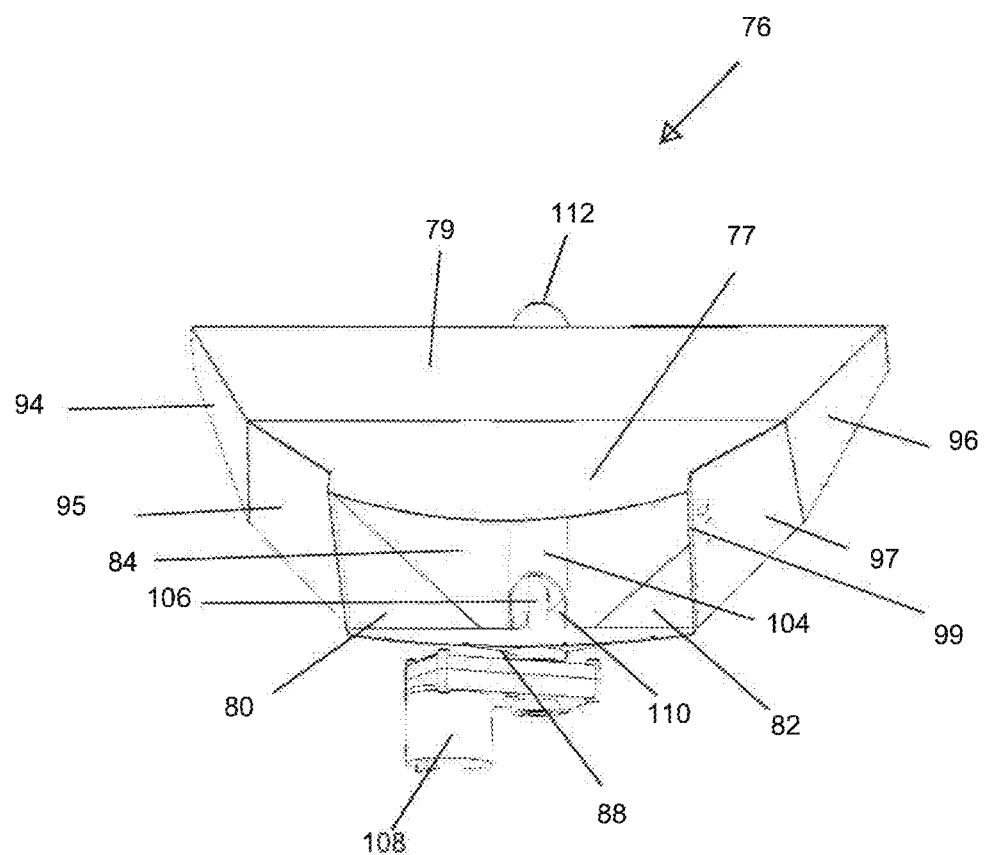
FIG. 20 is a front perspective view of the pellet feed hopper and auger of the exemplary embodiment of a kamado-style cooker with pellet feed in accordance with the present solution.
Figure 21:
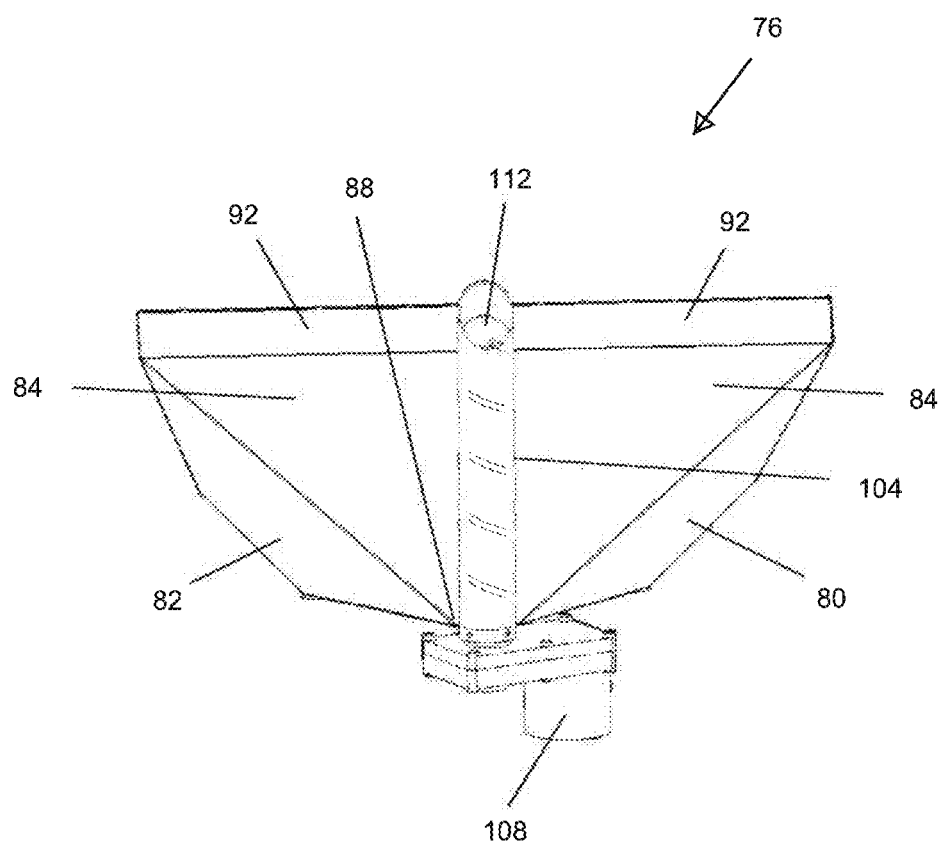
FIG. 21 is a top perspective view of the pellet feed hopper and auger of the exemplary embodiment of a kamado-style cooker with pellet feed in accordance with the present solution.

With specific reference to FIGS. 14 and 15, the firebox 46 is vertically elongated and has a D-shaped cross-section. The firebox 46 includes a flat front side 50, a curved back side 48, and sides 52 that connect the edges of the flat front side 50 to the edges of the curved back side 48. The firebox 46 further has a sloped bottom 54 that supports the pellets. Front side 50 and the back side 48 of the firebox 46 have openings 60 for the admission of combustion air. The firebox 46 is surrounded by a shroud 64 that creates surrounding air channel 66 to direct combustion air to the openings 60 in the front side 50 and the back side 48 of the firebox 46. The firebox 46 has a D-shaped top opening 56 that penetrates firewall 116 to deliver heat and smoke to the cooking space 33.

The firebox space 27 also includes a fan 68 for delivering ambient air as combustion air through a fan cowl 70, through fan grate 72, through air channel 66, and then to the openings 60 in the front side 50 and the back side 48 of the firebox 46. Ambient air is pulled into the firebox space 27 through the perforated plate 24 in the bottom of the aluminum base 12. A controller 136 is also located in the firebox space 27.

Within the cooking space 33, a grill rack 134 is supported on the top edge of the ceramic cooking chamber base 28. A drip tray 118 is positioned below the grill rack 134 to catch drippings from the food on the grill rack 134. The drip tray 118 includes a collector 124, an offset support 119, and a heat deflector 120. The offset support 119 engages the lower portion of the ceramic cooking chamber base 28 and positions the collector 124 below the rollback 134. The heat deflector 120 is positioned above the firebox opening 56 and serves to spread the heat coming from the firebox 46 across the area below the grill rack 134. The drip tray 118 also includes side openings 122 that allow smoke and heat to rise around the periphery of the ceramic cooking chamber base 28 and the dome-shaped ceramic lid 32. The drip tray 118 further includes a spout 126 that penetrates the ceramic cooking chamber base 28 and the aluminum adapter 26 in order to deliver drippings collected by the collector 124 to a collection pail 130 attached to a collection pail hanger 132 on the outside of the kamado-style cooker 10.

The kamado-style style cooker according to the solution may include a controller 136 for starting and stopping the cooking process, for controlling the temperature within the cooking space 33, and for controlling the feed rate of pellets into the firebox 46. In order to start the cooking process, the user causes the controller 136 to start the auger 102 and feed pellets into the firebox 46. The controller 136 then instructs igniter 128 to initiate combustion of the pellets in the firebox 46. The controller 136 also starts the fan 68 in order to provide combustion air initially at a high rate. The user sets the desired temperature for the cooking space 33 by means of temperature control knob 43 connected to a potentiometer 137 (or digital input device), which in turn is connected to the controller 136. From the signal received from the potentiometer 137, the controller 136 determines the temperature selected by the user. The dome lid 32 includes a thermometer/temperature sensor 42 for determining the temperature within the cooking space 33. The output of the temperature sensor 42 is fed to a controller 136 and compared to the temperature set by the user. In order to control the temperature within the cooking space 33, the controller 136 controls the speed of the fan 68 and therefore the amount of combustion air delivered to the firebox 46. Based on pre-programming of the controller 136, the controller 136 controls the speed of the auger motor 108 in order to deliver the correct amount of pellets to the firebox 46 as combustion proceeds. When cooking is completed, the user instructs the controller 136 to stop further feed of pellets to the firebox 46, and the remaining pellets burnout. The controller 136 further includes a Wi-Fi receiver/transmitter connected to a Wi-Fi antenna 138. Consequently, the user can remotely start and stop the cooking process and set the temperature of the cooking space 33 by means of the Wi-Fi as transmitter.

Turning now to FIGS. 22-27, another exemplary embodiment of a kamado-style cooker with pellet feed in accordance with the present solution will be described. The exemplary embodiment 210 illustrated in FIGS. 22-27 includes similar components and structural arrangements as has been previously described in connection with the exemplary embodiment of FIGS. 1-21; however, embodiment 210 incorporates some additional features, one or more of which may be comprised in certain embodiments of the solution. Accordingly, the following description of the exemplary embodiment 210 will not entirely rehash the description offered above, as one of ordinary skill in the art will recognize the similarities in structure and function.

Figure 22:
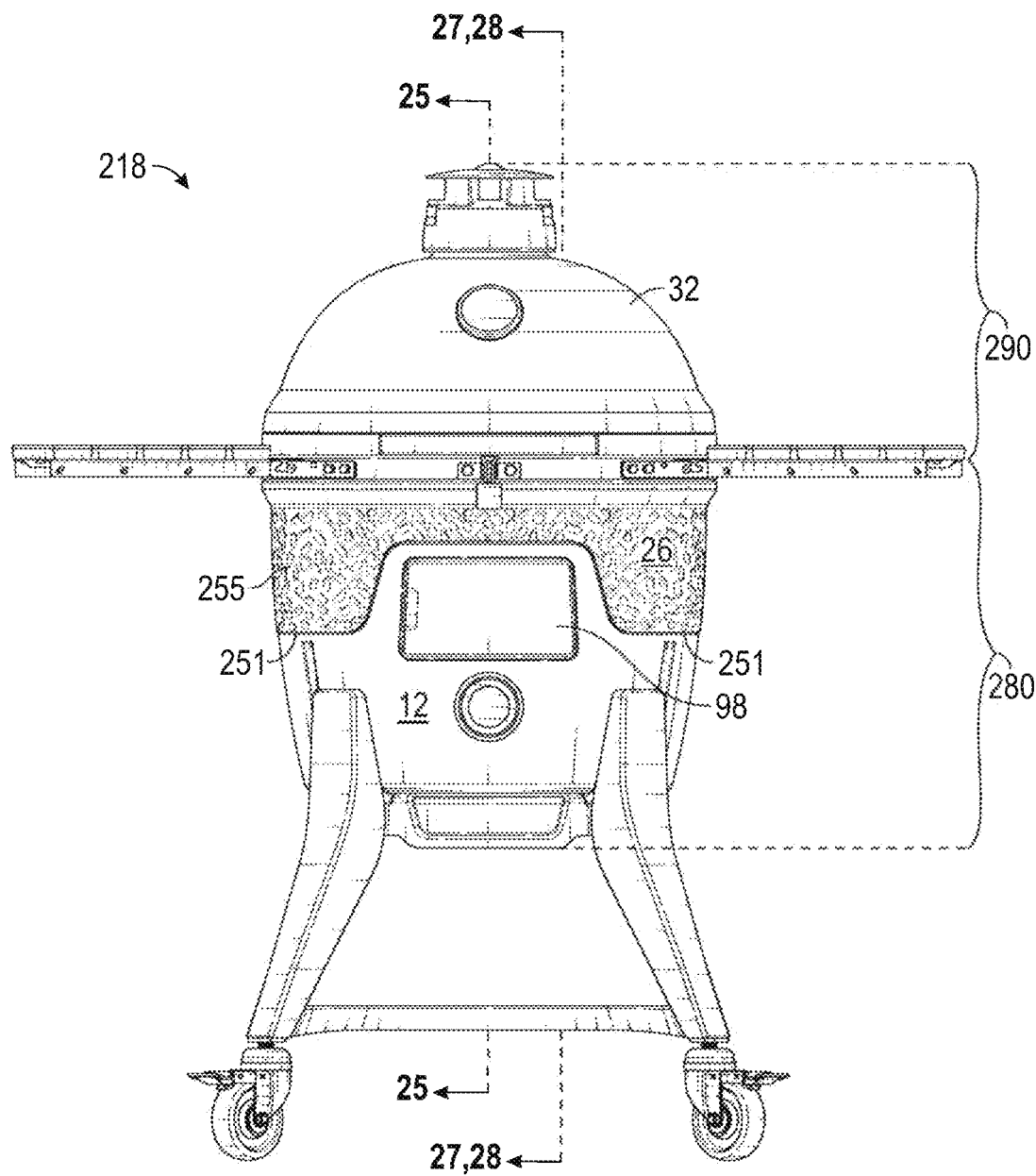
FIG. 22 is a front elevation view of an exemplary embodiment of a kamado-style cooker with pellet feed in accordance with the present solution.
Figure 23:
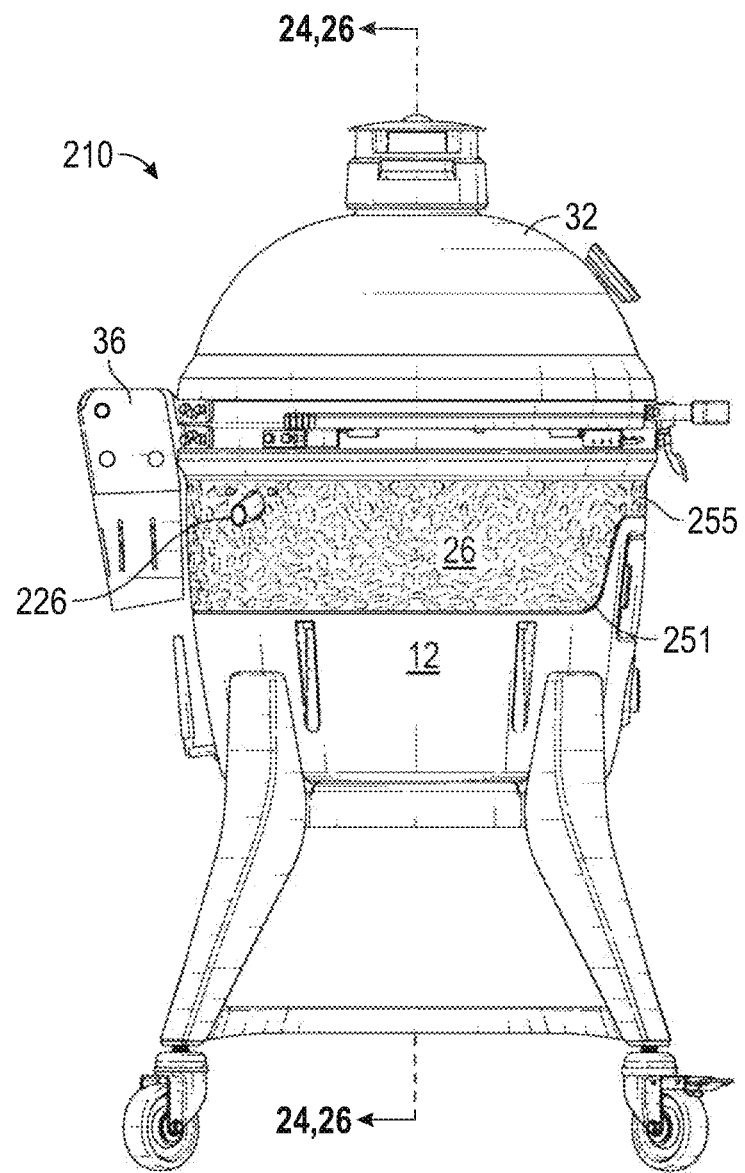
FIG. 23 is a left side elevation view of the exemplary embodiment of a kamado-style cooker with pellet feed shown in the FIG. 22 illustration.
Figure 26:
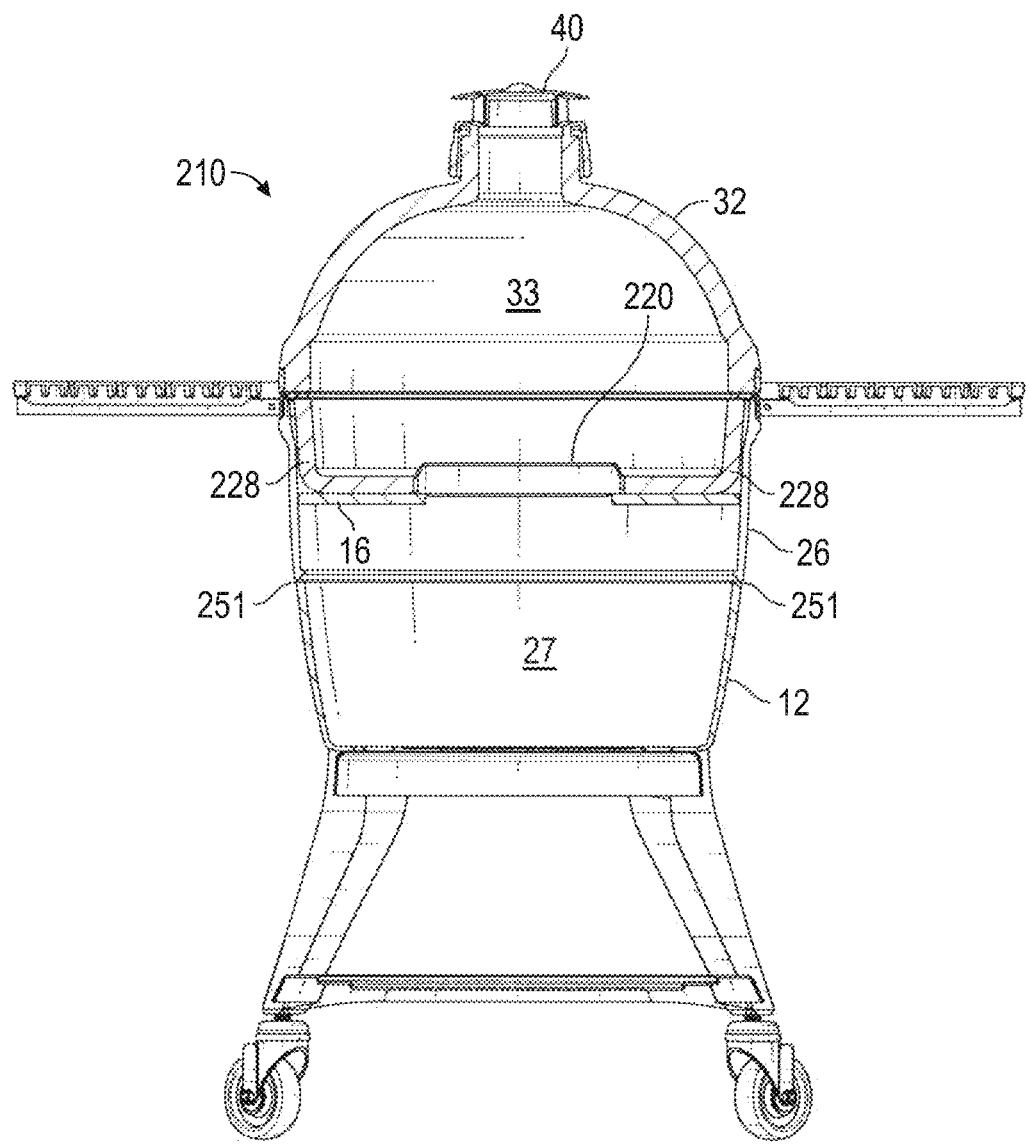
FIG. 26 is a front section view of the exemplary embodiment of a kamado-style cooker with pellet feed, cut along the line shown in the FIG. 23 illustration, with various components of the wood pellet supply, delivery and combustion subsystem (the "SDC subsystem") removed to more easily demonstrate the structural arrangement of components that form the ovoid structural envelope, firebox space, and internal cooking chamber.

FIG. 22 is a front elevation view, and FIG. 23 is a left side elevation view, of an exemplary embodiment 210 of a kamado-style cooker with pellet feed in accordance with the present solution. Ceramic lid 32, which cooperates with ceramic cooking chamber base 228 to define a dome-shaped cooking space 33 (see, for example, FIG. 26 illustration and previously provided description), may be rotated up and away from the lower half 280 of the cooker 210 via hinge 36 in order to give a user access to cooking food. For the purpose of this description, the lower half 280 of the cooker 210 is generally comprised of ceramic cooking chamber base 228, aluminum adapter 26 and aluminum base 12, while the upper half 290 of the cooker 210 is generally comprised of ceramic lid 32.

Notably, aluminum adapter 26 may include a surface texture 255 for increasing surface area of the aluminum adapter 26. Although not depicted in the illustrations of the exemplary embodiment, it is envisioned that certain embodiments of the solution may also incorporate a surface texture on the exterior of ceramic lid 32. Advantageously, an increase in surface area that results from the addition of surface texture 255 provides for relatively higher rates of thermal energy dissipation. As can be understood from the illustrations, aluminum adapter 26 may be in direct physical contact with ceramic cooking chamber base 228 (or ceramic cooking chamber base 28), as well as in direct physical contact with firewall 16, and therefore receive thermal energy transfer via conduction. Thermal energy received by aluminum adapter 26 may be dissipated via radiation and, as would be understood by one of ordinary skill in the art of heat transfer, the increased surface area resulting from surface texture 255 advantageously promotes an increased rate of radiation over that which can be radiated from a smooth surface.

In addition to the use of surface texture 255 to promote thermal energy dissipation from aluminum adapter 26, embodiments of the solution may include a thermal break aspect 251 between aluminum adapter 26 and aluminum base 12. It is envisioned that in some embodiments the thermal break aspect 251 may include a seal or buffer component comprised of a thermal insulating material such as, but not limited to, a rubber polymer, a plastic polymer, a fiberglass gasket, etc. Optionally, thermal break aspect 251 may be comprised simply of a physical seam or gap defined by the juxtaposition of aluminum adapter 26 and aluminum base 12, without any additional buffer component. Either way, it is an advantage of embodiments of the solution that the portion of the cooker's ovoid structural envelope defined by the lower half 280 includes a multi-component arrangement, such as is exemplified by aluminum adapter 26 and aluminum base 12, to create a thermal break aspect 251. In this way, embodiments of the solution advantageously mitigate the amount of thermal energy that may be conducted into aluminum base 12 which is the primary component defining the firebox space 27 for housing temperature-sensitive components of wood pellet SDC subsystem. Notably, shop tests on exemplary embodiments of the solution at the time of this writing have indicated that the temperature of aluminum adapter 26 may exceed the temperature of aluminum base 12 by over 100° F. when the cooker is in use.

Figure 24:
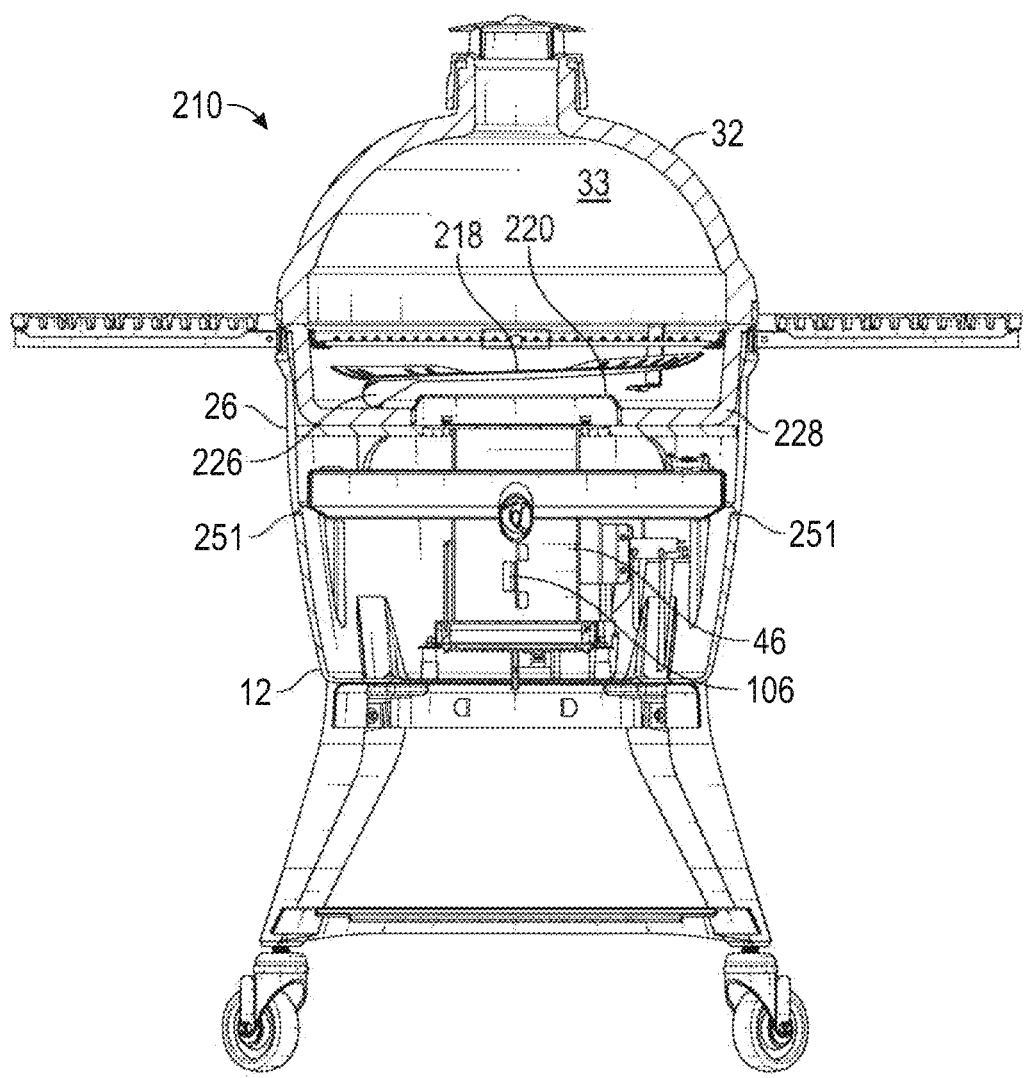
FIG. 24 is a front section view of the exemplary embodiment of a kamado-style cooker with pellet feed, cut along the line shown in the FIG. 23 illustration.
Figure 25:
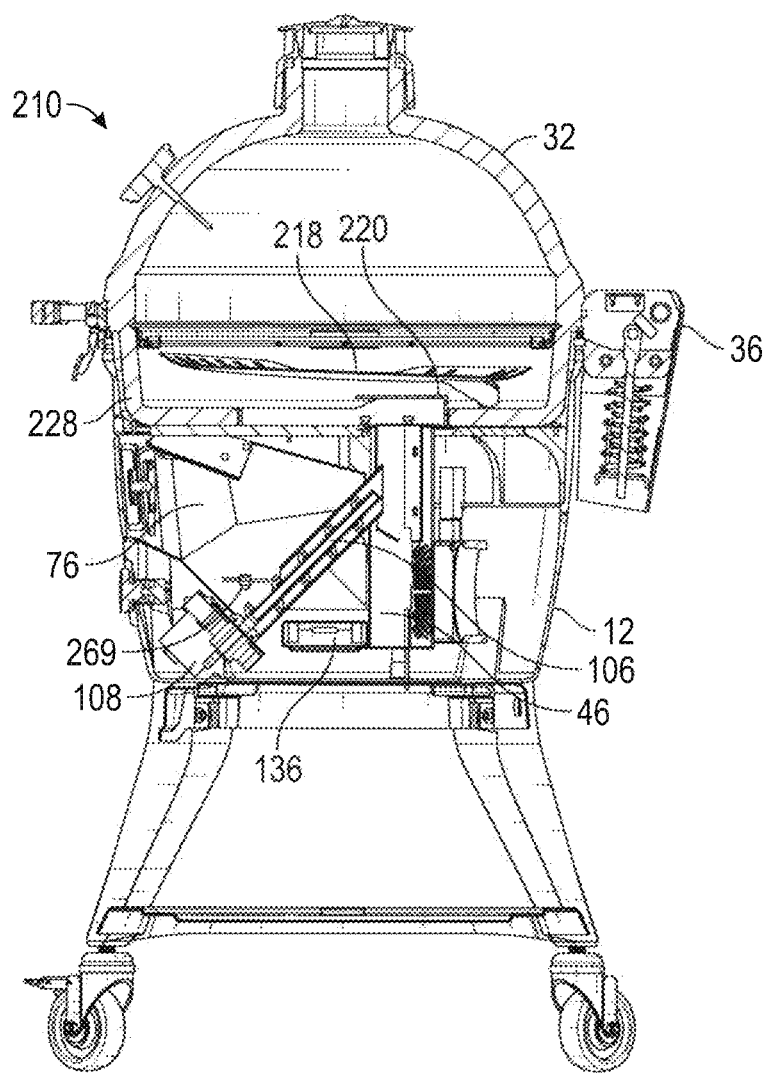
FIG. 25 is a right side section view of the exemplary embodiment of a kamado-style cooker with pellet feed, cut along the line shown in the FIG. 22 illustration.

FIG. 24 is a front section view of the exemplary embodiment of a kamado-style cooker with pellet feed, cut along the line shown in the FIG. 23 illustration, and FIG. 25 is a right side section view of the same, cut along the line shown in the FIG. 22 illustration. FIG. 26 is a front section view of the exemplary embodiment of a kamado-style cooker with pellet feed, cut along the line shown in the FIG. 23 illustration, with various components of the wood pellet supply, delivery and combustion subsystem (the "SDC subsystem") removed to more easily demonstrate the structural arrangement of components that form the ovoid structural envelope, firebox space, and internal cooking chamber. It can be understood from the illustrations in FIGS. 24-26 particularly that embodiments of the solution may include any number of unique and novel features necessary to address and overcome the challenges associated with the incorporation of a wood pellet SDC subsystem into a kamado-style cooker.

As previously described, embodiments of the solution, such as exemplary cooker 210, may include a lower half of the ovoid structural envelope defined by a plurality of components in order to create thermal break aspects, such as thermal break aspect 251 between aluminum adapter 26 and aluminum base 12. The thermal break aspect 251 coupled with firewall 16 and other thermal management features operate to create an environment in firebox space 27 suitable for housing temperature sensitive components of a wood pellet SDC subsystem, as will become more apparent from a review of the figures and description that follows.

As can be seen in the illustrations of FIGS. 24 and 25 (as well as in the illustrations of other Figures such as, but not limited to, FIG. 15), the wood pellet hopper 76 and auger screw 106 reside within firebox space 27. Wood pellets stored in hopper 76 and materially transferred in auger screw 106 may be prone to clogging and/or premature combustion if exposed to an excess of thermal energy before reaching firebox 46. Consequently, in addition to leveraging thermal break aspects 251 to manage thermal energy transfer into the firebox space 27, embodiments of the solution may incorporate other features that work to enable the integration of the SDC subsystem internal to the cooker. For example, agitators 269 may be operable to spin in order to breakup or dislodge clumped wood pellets and, thereby, facilitate gravity feed of wood pellets from hopper 76 to auger 106, as previously described. It is envisioned that the agitators 269 may be configured to reverse rotational direction in some embodiments.

Additionally, auger screw 106 may be set on an angle in order to increase the length of the auger screw relative to an auger screw placed in a vertical orientation. Advantageously, a relatively longer auger screw oriented on an angle, such as auger screw 106, maximizes a distance from wood pellets stored in the hopper 76 to an entry point of firebox 46 at the upper end of auger screw 106. In this way, wood pellets queued in auger screw 106 for material transfer to firebox 46, and especially wood pellets stored in hopper 76 prior to entry into auger 106, may experience less exposure to thermal energy radiating from ongoing combustion within firebox 46.

Also, because embodiments of the solution provide for management of thermal energy transfer into firebox space 27, electrical components of wood pellet SDC subsystem may be advantageously housed within firebox space 27. As can be understood from the FIGS. 24 and 25 illustrations, a controller 136, an auger motor 108, motors that drive agitators 269, motors that drive hopper fan(s) 271 (not shown), motors that drive firebox fan 68, and various instrumentation such as, but not limited to, a hopper pressure sensor 272 (not shown) may be advantageously housed within the firebox space 27 instead of external to the ovoid structural envelope of the cooker.

Moreover, it is envisioned that certain embodiments of the solution may leverage a hopper fan 271 to maintain a pressure within hopper 76 and auger 106 that exceeds any pressure generated by firebox fan 68. In this way, thermal energy generated from ongoing combustion within firebox 46 may be mitigated or prevented from transfer into auger 106 and hopper 76 via convection. It is envisioned that in some embodiments that leverage a hopper fan 271, the hopper fan 271 may simply be sized to generate a higher pressure than that which may be generated by firebox fan 68 and remain constantly "on" when the cooker is in use. In other embodiments, however, the controller 136 may monitor the fan speed of firebox fan 68 and, in view of the fan speed of firebox fan 68, determine and instruct the hopper fan 271 to operate at a speed sufficient to generate a pressure in excess of the pressure being generated by the firebox fan 68. In other embodiments still, the controller 136 may receive a pressure signal input from a pressure sensor 272 within hopper 76 and, in view of the fan speed of firebox fan 68 or a pressure signal associated with the pressure being generated by firebox fan 68, modulate the fan speed of hopper fan 271 to operate at a speed sufficient to generate a pressure in excess of the pressure being generated by the firebox fan 68.

Embodiment 210 further includes a drip tray 218 that is physically separate from heat deflector 220. Similar to that which has been described above relative to drip tray 118, drip tray 218 includes a spout 126 that penetrates the ceramic cooking chamber base 28 and the aluminum adapter 26 in order to deliver drippings to a collection pail located exterior to the kamado-style cooker 210. Notably, however, unlike drip tray 118 that includes an integrated heat deflector 120 (see, for example, FIG. 18), drip tray 218 does not incorporate a heat deflector. As would be understood by one of ordinary skill in the art of kamado-style cookers and wood pellet grills generally, the temperature emanating from the firebox 46 may be extreme. The heat deflector 220, like heat deflector 120, may be configured to reduce concentration of the thermal energy and better distribute it throughout the cooking space 33, thereby avoiding undesirable hot spots. Because heat deflector 220 is not in physical contact with drip tray 218, which is relatively thin, drip tray 218 may avoid exposure to thermal energy conducted from heat deflector 220 and, in this way, mitigate the likelihood that drip tray 218 may physically warp or otherwise prematurely fail.

Figure 27A:
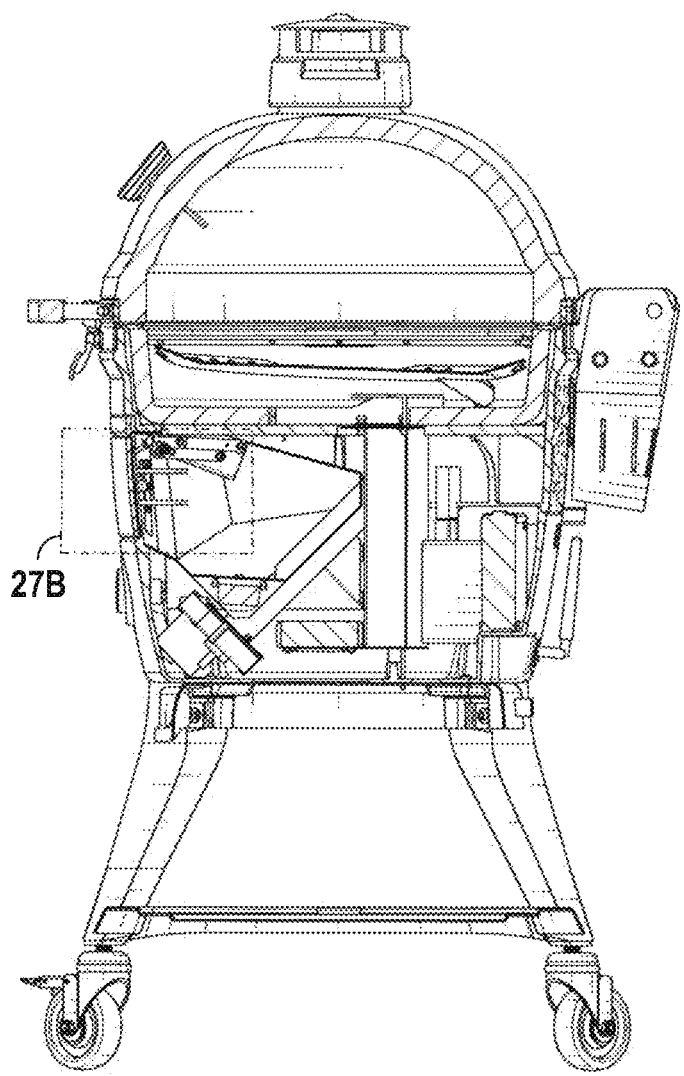
FIG. 27A is a right side section view of the exemplary embodiment of a kamado-style cooker with pellet feed, cut along the line shown in the FIG. 22 illustration to highlight the retracting chute aspect in a retracted, storage state.
Figure 27B:
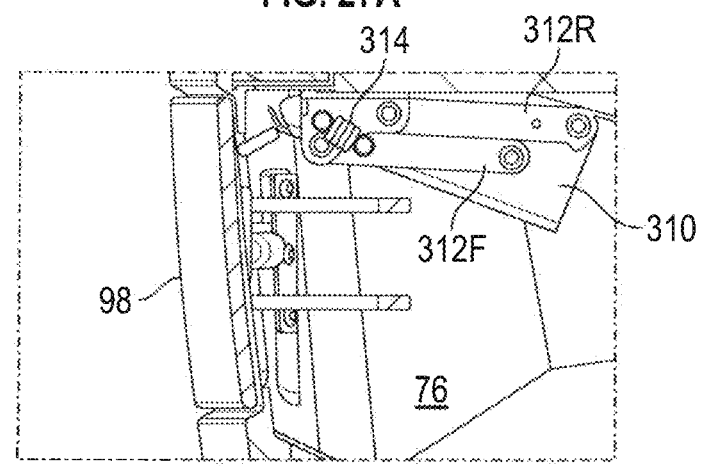
FIG. 27B is a close-up view of the retracting chute aspect highlighted in the FIG. 27A illustration.

FIG. 27A is a right side section view of the exemplary embodiment of a kamado-style cooker with pellet feed, cut along the line shown in the FIG. 22 illustration to highlight the retracting chute aspect in a retracted, storage state. And, FIG. 27B is a close-up view of the retracting chute aspect highlighted in the FIG. 27A illustration. As can be understood from the FIG. 27 illustrations, the retracting chute 310 may be operable to reside within the hopper component 76 space, behind close door 98, when in its storage state. The retracting chute may be operable via a four bar mechanism, as would be understood by one of ordinary skill in the art. In the FIG. 27B illustration, only a right-side view of the retracting chute 310 is shown, thereby only two bars, front bar 312F and rear bar 312R, of the four bar mechanism can be seen. A spring 314 applies a constant force that urges the retracting chute 310 to remain in its storage state.

Figure 28A:
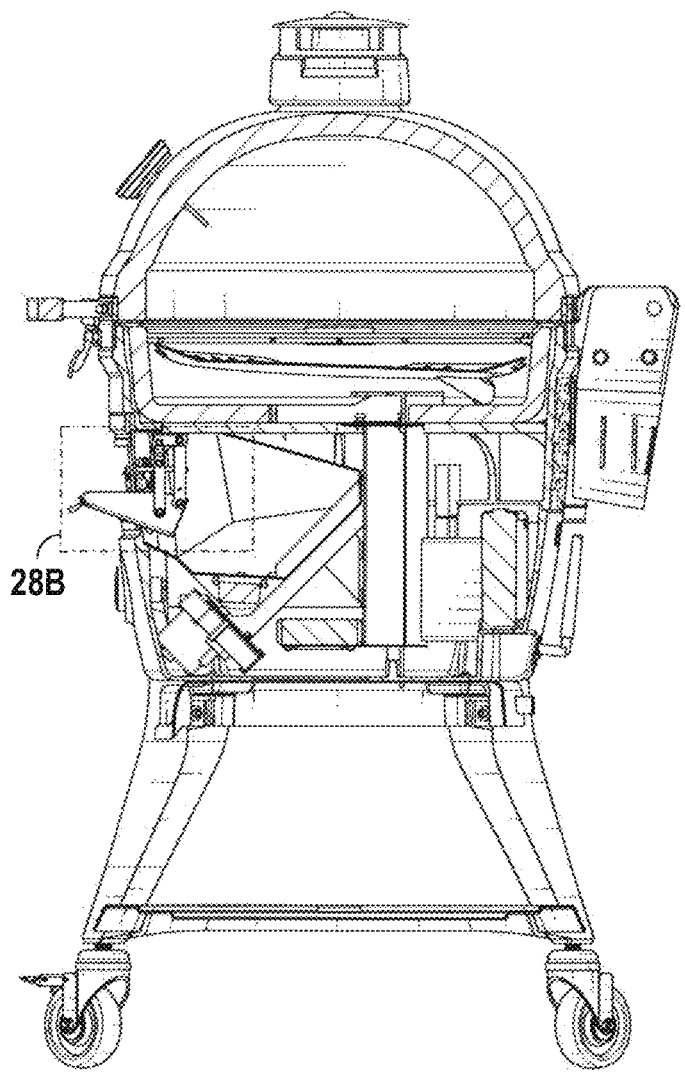
FIG. 28A is a right side section view of the exemplary embodiment of a kamado-style cooker with pellet feed, cut along the line shown in the FIG. 22 illustration to highlight the retracting chute aspect in an extended state for receiving a pelletized fuel into the hopper component.
Figure 28B:
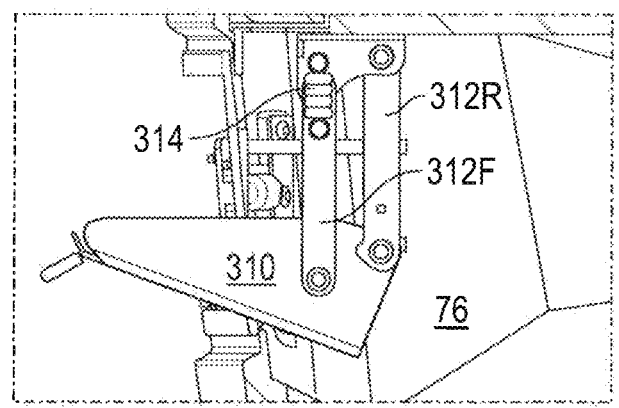
FIG. 28B is a close-up view of the retracting chute aspect highlighted in the FIG. 28A illustration.

FIG. 28A is a right side section view of the exemplary embodiment of a kamado-style cooker with pellet feed, cut along the line shown in the FIG. 22 illustration to highlight the retracting chute aspect in an extended state for receiving a pelletized fuel into the hopper component. And, FIG. 28B is a close-up view of the retracting chute aspect highlighted in the FIG. 28A illustration. As can be understood from the FIG. 28 illustration, the access door 98 to the hopper 76 has been opened such that the retracting chute 310 may be extended outward and at least partially to the exterior of the cooker. The bars 312F and 312R are in a substantially vertical orientation relative to their orientation in the FIG. 27 illustration. Advantageously, with the retracting chute 310 in this extended state, a user may more easily load the hopper 76 with pelletized fuel by pouring the pelletized fuel onto the chute 310. Notably, the chute 310 may be in a slightly inclined orientation when in the extended state in order to gravitationally urge pelletized fuel into hopper component 76.

Figure 29:
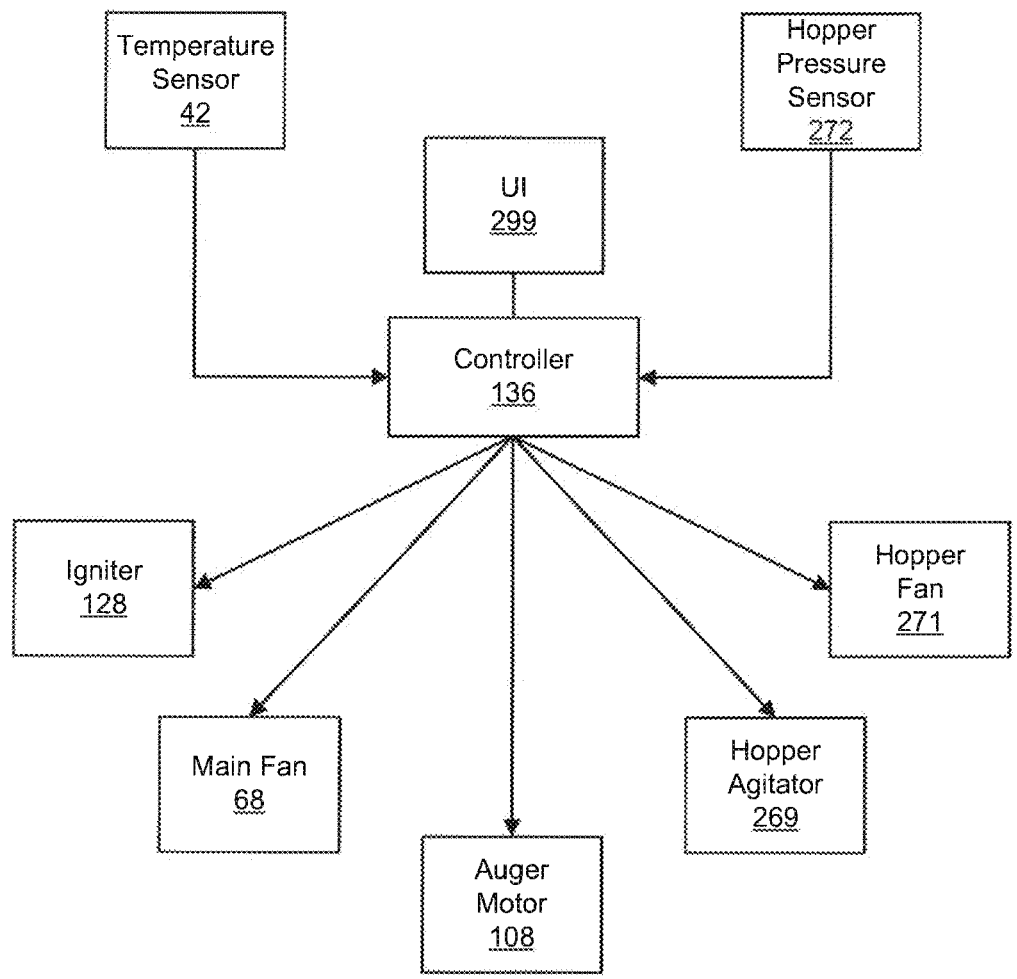
FIG. 29 is a functional block diagram illustrating various SDC subsystem components within an exemplary embodiment of the solution that may be in electrical communication.

Turning now to FIG. 29, illustrated is a functional block diagram showing various SDC subsystem components within an exemplary embodiment of the solution that may be in electrical communication. The controller 136 may be of any type available in the art and suitable for application within a kamado-style cooker according to the solution and, as such, the scope of the solution is not limited by inclusion of any particular type of controller. As would be understood by one of ordinary skill in the art electronics, a controller 136 may comprise, among other components, one or more chips or processors configured for execution of instructions that are stored in a memory device of the controller. The controller 136 may be battery powered (i.e. by direct current—DC) or, depending on controller type, may be powered by alternating current (AC), as would be understood by one of ordinary skill in the art. The controller 136 may also include a radio frequency transceiver and a modem and be configured for remote/wireless communication and configuration, as would be understood by one of ordinary skill in the art. The controller 136 may receive electrical signal inputs indicative of some condition or conditions, such as an electrical signal input from a temperature sensor 42 indicating a measured temperature, and based on the inputs generate an output signal according to instructions executed from memory storage. The controller 136 may also include a user interface 299 and it is envisioned that the user interface 299 may be local to the controller 136 or remotely accessible via a wireless device, such as a smartphone, via the wireless transceiver. The user interface may include a touchscreen, actuation buttons, or other input mechanisms configured to receive user inputs.

Any one or more of the components represented in the FIG. 29 diagram may form part of an SDC subsystem and may reside within the firebox space 27. Not all components of an SDC subsystem incorporated into an embodiment of a kamado-style cooker according to the solution has to necessarily reside within firebox space 27; however, it is envisioned that electronic components of an SDC subsystem that are sensitive to excessive thermal energy exposure may reside in the firebox space 27, for reasons and motivations previously described.

The controller 136 may be in electrical communication with various sensors such as, but not limited to, temperature sensor 42 and hopper pressure sensor 272. Based on the inputs received from sensors, and in view of inputs/settings received from a user via user interface 299, the controller 136 may generate output signals that actuate or modulate one or more of the auger motor 108 for varying speed of wood pellet delivery to the firebox, the igniter 128 for initiating combustion of wood pellets within the firebox, the main fan 68 for delivering air to the firebox, the hopper agitator 269 for urging wood pellets toward the auger 106, and the hopper fan 271 for generating a positive air pressure within the hopper and auger that exceeds air pressure generated by the main fan 68.

A kamado-style cooker with pellet feed according to the solution has been described using detailed descriptions of embodiments thereof that are provided by way of example and are not intended to limit the scope of the disclosure. The described embodiments comprise different features, not all of which are required in all embodiments of a kamado-style cooker with pellet feed according to the solution. Some embodiments of the solution utilize only some of the features or possible combinations of the features. Variations of embodiments of the solution that are described and embodiments of the solution comprising different combinations of features noted in the described embodiments will occur to persons of the art.

It will be appreciated by persons skilled in the art that a kamado-style cooker with pellet feed according to the solution is not limited by what has been particularly shown and described herein above. Rather, the scope of a kamado-style cooker with pellet feed according to the solution is defined by the claims that follow.

What is claimed is:

1. A kamado-style cooker, comprising:
   an upper half of the cooker defined by a dome shaped lid having an exterior surface and an interior surface, wherein the exterior surface of the dome shaped lid defines an exterior shape of the upper half of the cooker and the interior surface of the dome shaped lid defines an upper portion of an internal cooking space;
   a lower half of the cooker defined by at least one circumferential component having an exterior surface that defines an exterior shape of the lower half of the cooker;
   a cooking chamber base configured to nest in the at least one circumferential component such that an internal surface of the cooking chamber base defines a lower portion of the internal cooking space and an external bottom surface of the cooking chamber base cooperates with the at least one circumferential component to define a firebox space;
   a firebox having an upper end and a lower end and configured for combustion of a pelletized fuel, the firebox residing substantially within the firebox space and positioned such that a heat deflector associated with the upper end of the firebox resides within the lower portion of the internal cooking space; and
   a motor-driven auger residing within the firebox space and positioned on an angle of between 15 degrees and 85 degrees relative to level, wherein the auger is in mechanical communication with the firebox such that actuation of the auger operates to materially transfer pelletized fuel from a hopper to the firebox.

2. The kamado-style cooker of claim 1, wherein at least one of the exterior surface of the upper half of the cooker and the exterior surface of the lower half of the cooker comprises a texture for increased surface area to promote thermal energy dissipation.

3. The kamado-style cooker of claim 1, wherein the dome shaped lid and the cooking chamber base are each constructed of a pottery, earthenware, stoneware, porcelain, clay, refractory, or a composition of cement and lava rock.

4. The kamado-style cooker of claim 1, wherein at least one of the upper half of the cooker and the lower half of the cooker are constructed of aluminum.

5. The kamado-style cooker of claim 1, further comprising a firewall component positioned within the lower half of the cooker and in juxtaposition to the external bottom surface of the cooking chamber base.

6. The kamado-style cooker of claim 1, further comprising one or more motor-driven, rotating agitators positioned within the hopper component.

7. The kamado-style cooker of claim 1, further comprising:
   a main fan residing within the firebox space and positioned to supply a first flow of air to the firebox to encourage combustion of the pelletized fuel.

8. The kamado-style cooker of claim 7, further comprising:
   a hopper fan residing within the firebox space and positioned to supply a second flow of air to the hopper, wherein the second flow of air operates to pressurize the hopper at a second pressure that exceeds a first pressure associated with the first flow of air.

9. The kamado-style cooker of claim 8, further comprising:

a controller residing within the firebox space and configured to actuate one or more of the motor-driven auger, the main fan, and the hopper fan according to a set of computerized instructions.

10. The kamado-style cooker of claim 1, further comprising a drip tray residing within the lower portion of the internal cooking space and mechanically separated from the heat deflector.

11. The kamado-style cooker of claim 1, further comprising one or more of a temperature sensor and a pressure sensor.

12. The kamado-style cooker of claim 11, further comprising:
   a controller residing within the firebox space and configured to receive electrical inputs from the one or more temperature sensor and pressure sensor.

13. The kamado-style cooker of claim 1, further comprising a hopper access door in the exterior surface of the lower half of the cooker and a retracting chute, wherein when the hopper access door is opened the retracting chute is operable to extend outward from a retracted position to receive pelletized fuel into the hopper component.

14. The kamado-style cooker of claim 13, wherein the retracting chute comprises a spring-loaded, four bar mechanism.

15. The kamado-style cooker of claim 1, further comprising a sealing component in a seam defined by the nested cooking chamber base and the at least one circumferential component.

16. The kamado-style cooker of claim 1, further comprising a hinge mechanism operable to rotate the dome shaped lid up and away from the cooking chamber base.

* * * * *